United States Patent [19]
Hirano

[11] Patent Number: 5,771,405
[45] Date of Patent: Jun. 23, 1998

[54] SHAKE CORRECTING APPARATUS

[75] Inventor: Shinichi Hirano, Utsunomiya, Japan

[73] Assignee: Nikon Corporation, Tokyo, Japan

[21] Appl. No.: 707,013

[22] Filed: Sep. 3, 1996

[30] Foreign Application Priority Data

| Sep. 7, 1995 | [JP] | Japan | 7-230052 |
| Sep. 13, 1995 | [JP] | Japan | 7-235668 |
| Sep. 14, 1995 | [JP] | Japan | 7-9236973 |

[51] Int. Cl.$^6$ .................................................. G03B 17/00
[52] U.S. Cl. ............................................................. 396/55
[58] Field of Search .............................. 396/52, 53, 54, 396/55

[56] References Cited

U.S. PATENT DOCUMENTS

| 5,117,246 | 5/1992 | Takahashi et al. | 354/202 |
| 5,153,633 | 10/1992 | Otani | 354/430 |
| 5,181,056 | 1/1993 | Noguchi et al. | 396/55 |
| 5,335,032 | 8/1994 | Onuki et al. | 396/55 |
| 5,585,875 | 12/1996 | Imafugi et al. | 396/55 |

FOREIGN PATENT DOCUMENTS

| 2-66525 | 3/1990 | Japan . |
| 2-183217 | 7/1990 | Japan . |
| 6-67274 | 3/1994 | Japan . |

*Primary Examiner*—Russell E. Adams

[57] ABSTRACT

In a shake correcting apparatus incorporating a lock function, if shake correcting control is executed immediately after unlocking, an impact is exerted on a shake correcting mechanism, and respondency of the shake correcting apparatus worsens due to the control for avoiding this impact. For preventing this, in a photographing apparatus including a shake correcting device and a lock device, there are provided a first communication unit, provided in the lens device, for transmits data about detected result of a locked-state to a body device, and a second communication unit, provided in the body device, for receiving the data about the detected result of the locked state.

33 Claims, 11 Drawing Sheets

SHAKE CORRECTING APPARATUS

BACKGROUND OF THE INVENTION

1. Field of the Invention

The present invention relates to a shake correcting apparatus incorporating a shake correcting function.

2. Related Background Art

In a photographing apparatus represented by a camera, an AF device (Auto Focusing Device) has become popular. In recent years, it has been proposed to further provide a VR apparatus (shake correcting apparatus) for correcting an image blur that is derived from a camera shake or the like.

The shake correcting apparatus detects fluctuations in angle of an optical axis, which are attributed to the camera shake or the like, and corrects the image blur on a photographed picture on the basis of a result of this detection. For instance, Japanese Patent Laid-Open Application No. 2-66535 discloses an example as applied to a single-lens optical system. Japanese Patent Laid-Open Application No. 2-183217 discloses an example wherein camera shake is corrected by moving a part of a photographing optical system of an inner focus type telescopic lens.

Further, a shake correcting apparatus with a lock mechanism employed for a non-operating time is disclosed in each of U.S. Pat. No. 5,117,246 (Camera System With Image Blur Preventive Function), U.S. Pat. No. 5,153,633 (Camera With Image Blur Correcting Function), and Japanese Patent Laid-Open Application No. 6-67274 (Camera With Image Blur Correcting Function).

However, the photographing apparatus incorporating both of the conventional shake correcting function and lock function has a drawback in which a time lag is inevitably caused until an unlocked state actually comes, since the body device transmits an unlock command to the lens device according to such a method that the body device transmits an unlock control command to the lens device.

Therefore, in such a case that the body device executes the shake correcting control immediately after the unlocking, the shake correcting control might be started before a completion of the unlocking. There is also a possibility in which the shake correcting apparatus is suddenly driven enough to make a large acceleration act, resulting in a collision with a stopper, etc., and giving an impact.

Further, for steering clear of such an impact upon the shake correcting apparatus, it can be considered that the body device, after a predetermined time has elapsed since transmission of an unlock command was transmitted to the lens device, transmits a shake correcting control command to the lens device. If thus done, however, it follows that the respondency when the shake correcting apparatus is activated declines.

Further, in shake correcting apparatuses including locked-state detecting devices, although capable of detecting an actual locked-state, there is almost no individual difference between the cameras, and a delayed time up to the completion of the unlocking since the unlocking was executed becomes fixed. Hence, there is a small control effect in terms of executing the shake correcting control after the predetermined time has elapsed since the unlock command was transmitted. For this reason, there can be done nothing better than actually providing a locked-state detection switch in the vicinity of the lock mechanism to enhance the respondency of the shake correcting apparatus. This therefore leads to an increase in costs.

In a still camera and a movie camera, an image blur may be caused by a camera shake when performing the photography. Developed under such circumstances is a shake correcting apparatus for correcting the shake by actually measuring a shake (deflection) produced in the camera, which involves using an angular speed sensor.

In this type of shake correcting apparatus, a shake correcting optical system (hereinafter referred to as a "correcting optical system") is so disposed on the optical axis of the photographing lens as to be tiltable. The optical axis of this correcting optical system is inclined in such a direction as to offset the shake of the camera, thus correcting an image blur on an object picture.

By the way, in this shake correcting apparatus, if the shake correction is not executed, a movement of the correcting optical system is not restrained. Therefore, the correcting optical system largely vibrates when carrying the camera, resulting in such drawbacks as an emission of sounds and further a damage to the correcting optical system.

Then, a conventional shake correcting apparatus has a known lock mechanism for locking the correcting optical system within the photographing lens when the photographing lens is removed from the camera (U.S. Pat. No. 5,117,246).

A well-known lock mechanism of the correcting optical system is provided with an electromagnetic magnet in the vicinity of the correcting optical system. This electromagnetic magnet is constructed to lock the correcting optical system when a supply of electricity from the camera body is stopped.

Further, with respect to a timing of locking the correcting optical system, a known mechanism is that the correcting optical system is unlocked in accordance with a switch (e.g., a "half-push switch of the release button") for preparing the photography, and, before winding a film, the correcting optical system is locked (U.S. Pat. No. 5,153,633).

Moreover, as an apparatus for improving the reliability on the unlocking operation, there is known a shake correcting apparatus for repeating the locking or unlocking operation a predetermined number of times while changing a drive condition until a desired locked- or unlocked-state is reached by providing a state detecting element for detecting a locked-state of the correcting optical system (Japanese Patent Laid-Open Application No. 6-67274).

Further, a known shake correcting apparatus emits an alarm when this state detecting element determines that a desired locked- or unlocked-state is not reached (Japanese Patent Laid-Open Application No. 6-67274).

Moreover, a known shake correcting apparatus is constructed such that a function of the mechanical lock mechanism is substituted by electrically controlling the location, which involves shifting the correcting optical system to a desired position (centering) and locating it in that position (Japanese Patent Laid-Open Application No. 6-67274).

Generally, the great majority of lock mechanisms of the shake correcting apparatuses lock the correcting optical systems with a stoppage of the supply of electricity to the electromagnetic magnet. Therefore, if the supply of electricity to the lock mechanism is stopped because of trouble pertaining to a power supply system, the correcting optical system is always locked.

In this state, if the shake correction or the location control is executed, a large burden is applied upon the correcting optical system and a motor, and therefore the problems is a damage to the camera.

In particular, if the correcting optical system is once locked because of the trouble pertaining to the power supply system, as stated in Japanese Patent Laid-Open Application No. 6-67274, the unlocking can be done even by repeating the unlocking operation.

Further, the ordinary operators have no countermeasure even by alarming this state.

Therefore, as a matter of fact, the shake correction or the location control is executed as the above state remains unchanged in the majority of cases, and it is difficult to avoid the worst situation of causing the damage to the camera.

Further, the force for restricting the movement of the correcting optical system does not work during a period until the shake correction or the location control is started since the correcting optical system has been unlocked. Therefore, the problem is that if impactive vibrations are exerted upon the camera during this period, the correcting optical system largely vibrates enough to be damaged.

For those reasons, it is required that the start timings of the shake correction and the location control be accurately controlled. This conduces to such a problem that a quantity of data treated by the control microcomputer increases, and arithmetic procedures become complicated.

Especially, a large quantity of signals relative to the photographing timing are required to be transferred to and received from the photographing lens side. This results in such a problem that the respondency of the operation extremely declines.

According to the construction disclosed in U.S. Pat. No. 5,153,633 given above, free vibrations of the correcting optical system are restrained by locking the correcting optical system for a duration excluding a period extending from the half-push of the release button to the film winding, thereby making it feasible to prevent the damage to the movable portion of the correcting optical system.

Normally, in the single-lens reflex camera, a quick return mirror (hereinafter simply termed a "mirror") is flipped up and down when photographed. The mirror is flipped up and down at a high speed, and consequently large vibrations are produced in the camera.

By the way, the correcting optical system is unlocked during such a period that the mirror is flipped up and down in the above-mentioned shake correction camera. Therefore, the correcting optical system largely oscillates due to the vibrations caused by flipping the mirror up and down.

When the correcting optical system largely oscillates in this manner, there arise problems of causing inconveniences such as the emission of sounds and, further, damage to the correcting optical system.

SUMMARY OF THE INVENTION

It is a primary object of the present invention to provide a shake correcting apparatus capable of stably and accurately determining a start timing of shake correction or location control with a simple construction.

It is another object of the present invention to provide a shake correcting apparatus capable of accurately preventing damage to a correcting optical system due to vibrations when photographed.

According to the present invention, the problems given above are solved by the following steps (1)–(7).

(1) A lens device transmits a signal showing a locked-state of the shake correcting optical system to a body device.

(2) The signal showing the locked-state of the shake correcting optical system to the lens device is transmitted after awaiting a stated signal request from the body device to the lens device.

(3) A start signal of the shake correction is transmitted after sending back an unlocked-state.

(4) A centering signal is transmitted after replying the unlocked-state.

(5) A lock command execution end signal is transmitted to the body device. This eliminates a necessity for a locked-state detection switch.

(6) The lock command execution end signal has a predetermined timing delayed time.

(7) The timing delayed time is a delayed time needed for executing the locking operation.

According to the present invention, a shake correcting apparatus comprises a photographing optical system of a photographing apparatus, a shake detecting unit for detecting a deflection of an optical axis in the photographing optical system, and a shake correcting optical system, disposed in a part of the photographing optical system, for correcting an image blur produced due to the deflection. The shake correcting apparatus also comprises a shake correction drive unit for relatively moving a part or whole of the shake correcting optical system with respect to a photographing picture, a shake correcting control unit for generating a shake correcting signal of the shake correcting drive unit on the basis of an output of the shake detecting unit, and a lock unit for locking the shake correcting optical system in a predetermined position. The shake correcting apparatus further comprises a locked-state detecting unit, provided in a body device or a lens device that constitute the photographing apparatus, for detecting whether or not the shake correcting optical system is locked in the predetermined position, a first communication unit, provided in the lens device, for transmitting an item of locked-state detected result data of the locked-state detecting unit to the body device from the lens device, and a second communication unit, provided in the body device, for receiving the locked-state detected result data.

According to the present invention, the second communication unit transmits, to the first communication unit, a locked-state detected result data transmission command for commanding the first communication unit to transmit the locked-state detected result data singly or together with other data to the second communication unit.

According to the present invention, the second communication unit further transmits, to the first communication unit, a shake correcting drive start command for commanding the shake correcting drive unit to start the shake correcting drive.

According to the present invention, the second communication unit further transmits, to the first communication unit, a start-of-lock command for commanding the lock unit to start the locking operation.

According to the present invention, the second communication unit further transmits, to the first communication unit, a start-of-unlock command for commanding the lock unit to start the unlocking operation.

According to the present invention, if there is a request for transmitting the shake start command, the second communication unit further holds the request for transmitting the shake start command till the request for transmitting the shake start command is discarded when the lock unit is in the locked state, or till the unlocked-state of the lock unit is detected on the basis of the locked-state detected result data.

According to the present invention, the second communication unit further transmits, to the first communication unit, the centering command for commanding the shake correcting drive unit to move to an optical central position.

According to the present invention, if there is a request for transmitting the centering command, the second communication unit further holds the request for transmitting the centering command till the request for transmitting the centering command is discarded when the lock unit is in the locked state, or till the unlocked-state of the lock unit is detected on the basis of the locked-state detected result data.

According to the present invention, a shake correcting apparatus comprises a photographing optical system of a photographing apparatus, a shake detecting unit for detecting a deflection of an optical axis in the photographing optical system, and a shake correcting optical system, disposed in a part of the photographing optical system, for correcting an image blur produced due the deflection. The shake correcting apparatus also comprises a shake correction drive unit for relatively moving a part or whole of the shake correcting optical system with respect to a photographing picture, a shake correcting control unit for generating a shake correcting signal of the shake correcting drive unit on the basis of an output of the shake detecting unit, and a lock unit for locking the shake correcting optical system in a predetermined position. The shake correcting apparatus further comprises a lock control unit for controlling the lock unit, a first communication unit, provided in the lens device constituting the photographing apparatus, for transmitting an item of lock command execution end data for showing whether or not the lock control unit finishes outputting a lock signal or an unlock signal to the lock unit from the lens device to the body unit combined with the lens device, and a second communication unit, provided in the body device, for receiving the lock command execution end data.

According to the present invention, the second communication unit further transmits, to the first communication unit, a lock command execution end data transmission command for commanding the first communication unit to transmit the lock command execution end data singly or together with other data to the second communication unit.

According to the present invention, the second communication unit further transmits, to the first communication unit, a shake correcting drive start command for commanding the shake correcting drive unit to start the shake correcting drive.

According to the present invention, the second communication unit further transmits, to the first communication unit, a start-of-lock command for commanding the lock unit to start the locking operation.

According to the present invention, the second communication unit further transmits, to the first communication unit, a start-of-unlock command for commanding the lock unit to start the unlocking operation.

According to the present invention, if there is a request for transmitting the shake start command, the second communication unit further holds the request for transmitting the shake start command till the request for transmitting the shake start command is discarded when the lock unit is in the locked state, or till the unlocked-state of the lock unit is detected on the basis of the lock command execution end data.

According to the present invention, the second communication unit further transmits, to the first communication unit, the centering command for commanding the shake correcting drive unit to move to an optical central position.

According to the present invention, if there is a request for transmitting the centering command, the second communication unit further holds the request for transmitting the centering command till the request for transmitting a start-of-centering command is discarded when determining that the lock unit is in the locked state, or till the lock unit is determined to be in the locked-state on the basis of the lock command execution end data.

According to the present invention, further, the lock command execution end data showing whether or not an unlock signal is outputted is delayed by a predetermined time and then transmitted to the body device from the lens device.

According to the present invention, furthermore, the predetermined time is a time necessary for the lock unit to finish the unlocking operation of the locking operation since the lock control unit started the lock control.

According to the present invention, a shake correcting apparatus comprises a shake detecting unit for detecting a shake quantity of a camera, a shake correcting unit for moving an optical system or an imaging surface in the camera in such a direction as to offset the shake quantity detected by the shake detecting unit, and a lock unit for locking the movement of the optical system or the imaging surface that is moved by the shake correcting unit. The shake correcting apparatus further comprises a state detecting unit for detecting whether or not the optical system or the imaging surface is unlocked. The shake correcting unit stops the movement drive of the optical system or the imaging surface when the state detecting unit determines that the unlocking is incomplete when starting the shake correcting operation.

According to the present invention, further, the shake correcting unit awaits till the state detecting unit determines that the unlocking is completed and starts moving the optical system or the imaging surface.

According to the present invention, a shake correcting apparatus comprises a shake detecting unit for detecting a shake quantity of a camera, a shake correcting unit for moving an optical system or an imaging surface in the camera in such a direction as to offset the shake quantity detected by the shake detecting unit, a locating unit for location-controlling the optical system or the imaging surface in a predetermined position that is moved by the shake correcting unit, and a lock unit for locking the movement of the optical system or the imaging surface that is moved by the shake correcting unit. The shake correcting apparatus further comprises a state detecting unit for detecting an unlocked-state of the optical system or the imaging surface. The above locating unit stops the location control of the optical system or the imaging surface when the state detecting unit determines that the unlock is incomplete.

According to the present invention, further, the locating unit awaits till the state detecting unit determines that the unlocking is completed and starts the location control of the optical system or the imaging surface.

According to the present invention, furthermore, the above state detecting unit determines that the unlocking is completed after a predetermined time has elapsed since the unlocking of the optical system or the imaging surface was started.

According to the present invention, a shake correcting apparatus comprises a shake detecting unit for detecting a shake quantity of a camera, a shake correcting unit for moving an optical system or an imaging surface in the camera in such a direction as to offset the shake quantity detected by the shake detecting unit, and a lock unit for locking the movement of the optical system or the imaging surface that is moved by the shake correcting unit. The shake correcting unit unlocks the optical system or the imaging surface that is locked by the lock unit in advance of the shake correction control.

According to the present invention, a shake correcting apparatus comprises a shake detecting unit for detecting a shake quantity of a camera, a shake correcting unit for moving an optical system or an imaging surface in the camera in such a direction as to offset the shake quantity detected by the shake detecting unit, a locating unit for location-controlling, in a predetermined position, the optical system or the imaging surface that is moved by the shake correcting unit, and a lock unit for locking the movement of the optical system or the imaging surface that is moved by the shake correcting unit. The above locating unit unlocks the optical system or the imaging surface that is locked by the lock unit.

In the shake correcting apparatus of the present invention, if the unlocking is incomplete when starting the shake correcting operation, the shake correcting unit stops the movement of the optical system or the imaging surface.

In the shake correcting apparatus of the present invention, the shake correcting unit awaits till the completion of the unlocking is determined and starts moving the optical system or the imaging surface.

In the shake correcting apparatus of the present invention, when determining the unlocking is incomplete at the start of the location control operation, the locating unit stops the location control of the optical system or the imaging surface.

In the shake correcting apparatus of the present invention, the locating unit awaits till the unlocking is completed and starts the location control of the optical system or the imaging surface.

In the shake correcting apparatus of the present invention, the state detecting unit determines that the unlocking is completed after the predetermined time has elapsed since the unlocking operation was started without directly detecting the unlocked state.

In the shake correcting apparatus of the present invention, the shake correcting unit releases the locking by the lock unit as a preparation for starting the shake correction.

In the shake correcting apparatus of the present invention, the locating unit releases the locking by the lock unit as a preparation for starting the location control.

According to the present invention, a shake correcting apparatus comprises a shake detecting unit for detecting a shake quantity of a camera, a shake correcting unit for moving an optical system or an imaging surface in the camera in such a direction as to offset the shake quantity detected by the shake detecting unit, and a lock unit for locking the movement of the optical system or the imaging surface that is moved by the shake correcting unit. In the shake correcting apparatus, the lock unit takes photography timing data form the camera and, on the basis of the timing data, locks the optical system of the imaging surface till an exposure on the imaging surface is started since the photography preparatory operation of the camera was started.

According to the present invention, the lock unit takes the photography timing data from the camera and, on the basis of the timing data, locks the optical system or the imaging surface till an end of the mirror-up since the mirror-up was started in the camera.

According to the present invention, a shake correcting apparatus comprises a shake detecting unit for detecting a shake quantity of a camera, a shake correcting unit for moving an optical system or an imaging surface in the camera in such a direction as to offset the shake quantity detected by the shake detecting unit, and a lock unit for locking the movement of the optical system or the imaging surface that is moved by the shake correcting unit. The lock unit takes the photography timing data from the camera and, on the basis of the timing data, locks the optical system or the imaging surface with an end of the exposure on the imaging surface.

According to the present invention, further, the lock unit takes the photography timing data from the camera and, on the basis of the timing data, locks the optical system or the imaging surface till the mirror-down is ended since the mirror-down is started in the camera.

In the shake correcting apparatus of the present invention, the movement of the optical system or the imaging surface, which is moved by the shake correcting unit, is locked during a period from the start of the photography preparatory operation of the camera to a timing just before starting the exposure on the imaging surface.

In the shake correcting apparatus of the present invention, during the mirror-up period, the movement of the optical system or the imaging surface, which is moved by the shake correcting unit, is locked.

In the shake correcting apparatus of the present invention, with an end of the exposure in the camera, the movement of the optical system or the imaging surface, which is moved by the shake correcting unit, is locked.

In the shake correcting apparatus of the present invention, during the mirror-down period, the movement of the optical system or the imaging surface, which is moved by the shake correcting unit, is locked.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Embodiments of the present invention will hereinafter be described in greater detail with reference to the accompanying drawings.

Figure 1:
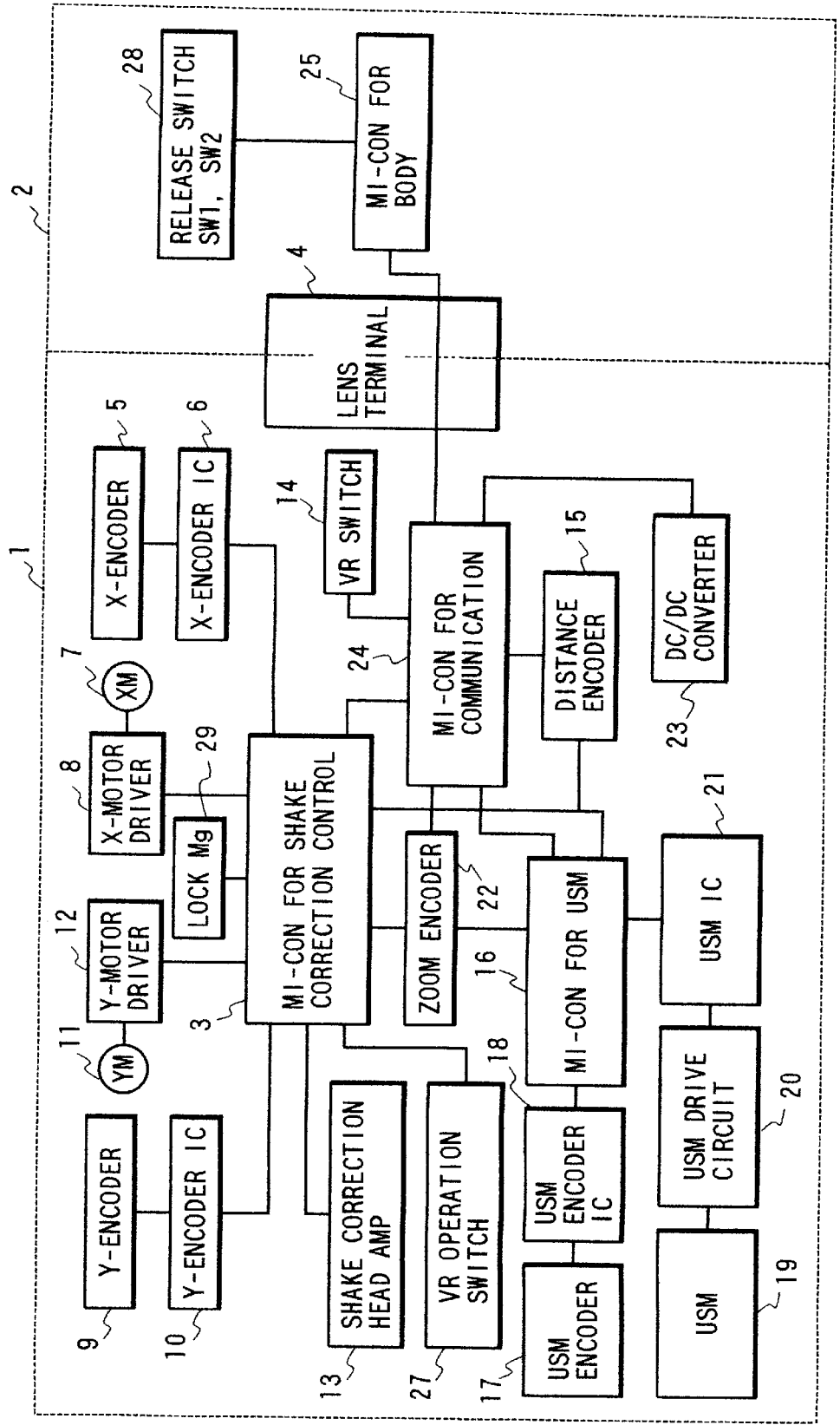
FIG. 1 is a block diagram showing a signal system of a photographing apparatus to which a first embodiment of a shake correcting apparatus of the present invention is applied.
Figure 3:
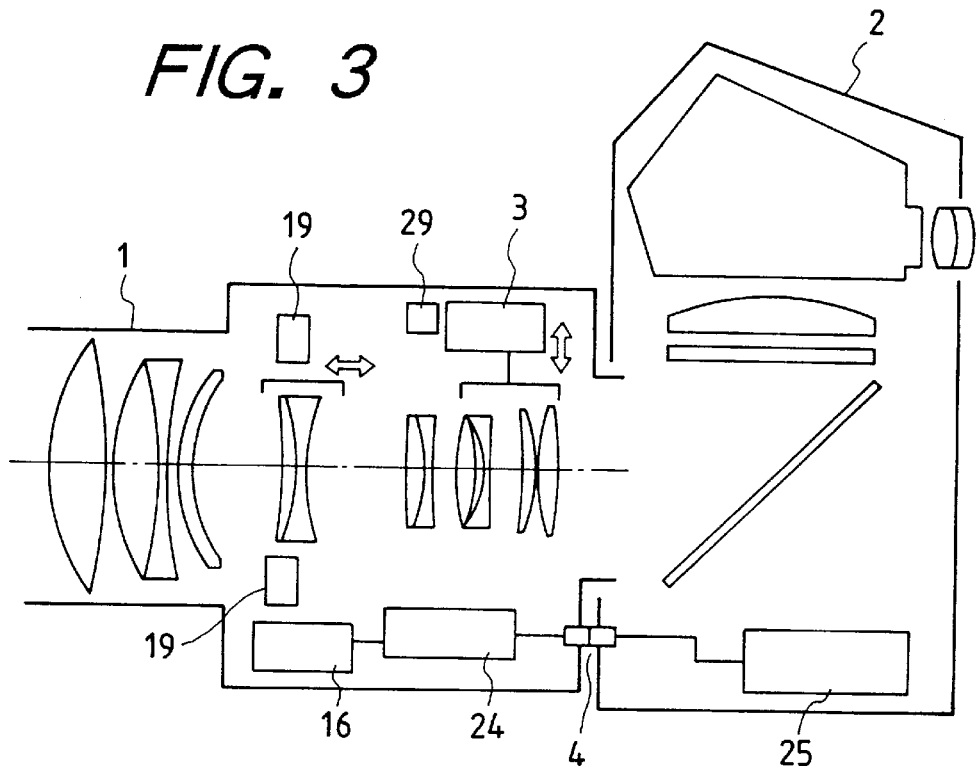
FIG. 3 is a schematic diagram showing a construction including a photographing optical system of the photographing apparatus to which the shake correcting apparatus in the first embodiment is applied.

FIG. 1 is a block diagram illustrating a block diagram illustrating a signal system of a photographing apparatus to which a shake correcting apparatus in a first embodiment of the present invention is applied. FIG. 3 is a schematic diagram showing a construction including a photographing optical system of the photographing apparatus to which the shake correcting apparatus in the first embodiment is applied.

As illustrated in FIGS. 1 and 3, this shake correcting apparatus is incorporated into the photographing apparatus (see FIG. 3) constructed of a lens device 1 and a body device 2. As will be mentioned later, a part of the photographing optical system is moved based on a detected value of a deflection quantity of an optical axis in the photographing optical system.

The lens device 1 is provided with a microcomputer 3 for shake correction control, a microcomputer 16 for an ultrasonic motor and a microcomputer 24 for communications. On the other hand, the body device 2 is provided with a microcomputer for the body.

The shake correction control microcomputer 3 controls a drive of a shake correction drive consisting of an X-axis drive motor 7, an X-axis motor driver 8, a Y-axis drive motor 11 and a Y-axis motor driver 12 on the basis of an output of the body microcomputer 25 of the body device 2, and optical system positional data given from an X-encoder 5, a Y-encoder 9, a distance encoder 15 and a zoom encoder 22.

Further, the shake correction control microcomputer 3 constitutes a locked-state detecting unit of a lock magnet 29 which will be mentioned later, and checks whether the lock magnetic 29 is locked or not from an electrifying condition of the lock magnet 29.

Further, the shake correction control microcomputer 3 also serves as a lock control unit for controlling the lock magnet 29.

Note that if the body device 2 is provided with the shake correction control microcomputer 3 serving as the locked-state detecting unit, an item of locked-state detected result data may be temporarily transmitted to the communication microcomputer 24 defined as a first communication unit provided in the lens device 1 and then transmitted to the shake correction control microcomputer 3 from the communication microcomputer 24.

A lens terminal 4 is an electric contact group used for transferring and receiving signals between the lens device 1 and the body device 2, and is connected to the communication microcomputer 24.

The X-encoder 5 detects a quantity of an X-axis directional movement of the optical system, and an output of the X-encoder 5 is connected to an X-encoder IC 6. The X-encoder IC 6 serves to convert the X-axis directional movement quantity of the optical system into an electric signal, and this signal is transmitted to the shake correction control microcomputer 3. Further, the X-axis drive motor 7 is a drive motor for driving and moving an X-axis deflection correcting optical system. The X-axis motor driver 8 is a circuit for driving the X-axis drive motor 7.

Similarly, the Y-encoder 9 serves to detect a Y-axis directional movement quantity of the optical system, and an output of the Y-encoder 9 is connected to a Y-encoder IC 10. The Y-encoder IC 10 serves to convert the Y-axis directional movement quantity of the optical system into an electric signal, and this signal is transmitted to the shake correction control microcomputer 3. Further, the Y-axis drive motor 11 is a drive motor for driving and moving a Y-axis deflection correcting optical system. The Y-axis motor driver 12 is a circuit for driving the Y-axis drive motor 11.

A shake correction head amplifier 13 is a shake detecting unit for detecting a shake quantity and also a circuit for detecting the shake quantity. More specifically, an item of image blur data is converted into an electric signal, and this signal is transmitted to the shake correction control microcomputer 3. For example, an angular speed sensor or the like is usable as the shake correction head amplifier 13.

A VR switch 14 is a switch for switching over ON/OFF states of the shake correction drive.

The distance encoder 15 is an encoder for detecting a focus position and converting it into an electric signal, and an output of which is similarly connected to the shake correction control microcomputer 3, the ultrasonic motor microcomputer 16 and the communication microcomputer 24.

The ultrasonic motor microcomputer 16 serves to control the ultrasonic motor 19 for driving a focusing optical system moving unit.

A USM encoder 17 is an encoder for detecting a movement quantity of the ultrasonic motor 19, and an output of which is connected to a USM encoder IC 18. The USM encoder IC 18 is a circuit for converting the movement quantity of the ultrasonic motor 19 into an electric signal, and this signal is transmitted to the ultrasonic motor microcomputer 16.

The ultrasonic motor 19 is a motor for moving the focusing optical system. An ultrasonic motor drive circuit 20 is a circuit, having a drive frequency intrinsic to the ultrasonic motor 19, for generating two drive signals having a 90° phase difference from each other. An ultrasonic motor IC 21 is a circuit serving as an interface between the ultrasonic motor microcomputer 16 and the ultrasonic motor drive circuit 20.

The zoom encoder 22 is an encoder for detecting a lens focal length position and converting it into an electric signal, and an output of which is connected to the shake correction control microcomputer 3, the ultrasonic motor microcomputer 16 and the communication microcomputer 24.

A DC-DC converter 23 is a circuit for supplying a DC voltage which is stable against voltage fluctuations of a power supply battery, and is controlled by the signal from the communication microcomputer 24.

The communication microcomputer 24 is a microcomputer for performing communications between the lens device 1 and the body device 2 and transferring commands to other microcomputers (such as the shake correction control microcomputer 3, the ultrasonic motor microcomputer 16, etc.) within the lens device 1. Further, in accordance with the first embodiment, the communication microcomputer 24 serves as a first communication unit for transmitting, to the body device 2, the locked-state detected result data outputted from the shake correction control microcomputer 3 serving as the locked-state detecting unit.

The first communication unit transmits, to the body device 2, an item of lock command execution end data showing whether or not the shake correction control microcomputer 3 defined as a lock control unit outputs a lock signal or unlock signal to the lock magnet 29.

The body microcomputer 25 indicates a shake correction display unit 27 to display an alarm by using maximum shake correction time data, exposure setting data and subject luminance data that are transferred from the lens device 1.

Further, in accordance with the first embodiment, the body microcomputer 25 serves as a second communication unit for receiving the lock-state detected result data outputted from the communication microcomputer 24. Further, the second communication unit also receives the lock command execution end data.

A release switch 28 is provided in the body device 2. A photographer transfers a start of exposure control to the body device 2, and, if designated by a shake correction control start switch determining process, a transmission timing of a shake correction control signal is determined. The release switch 28 is constructed of a half-push switch SW1 for starting a photography preparatory operation by half-pushing a release button with a finger of the photographer, and a full-push switch SW2 for indicating a start of the exposure control by fully pushing the release button.

The lock magnet 29 serves as a locking element for locking the shake correcting optical system in a predetermined position (central position). The lock magnet 29 is an electromagnetic magnet provided in the lens device 1 and interlocking with mechanism parts (unillustrated) provided for fixing a shake correcting mechanism. When electrifying the electromagnetic magnet, the shake correcting mechanism is in a movable state, and during non-electrification of the electromagnetic magnet, the shake correcting mechanism is in a locked-state. In other words, the lock magnet 29 is a lock mechanism incorporating an electrification type unlocking function to unlock the shake correcting mechanism from the predetermined stop position (central position) when electrified.

The photographing apparatus to which the shake correcting apparatus in the first embodiment is applied, is constructed as discussed in detail.

Figure 2:
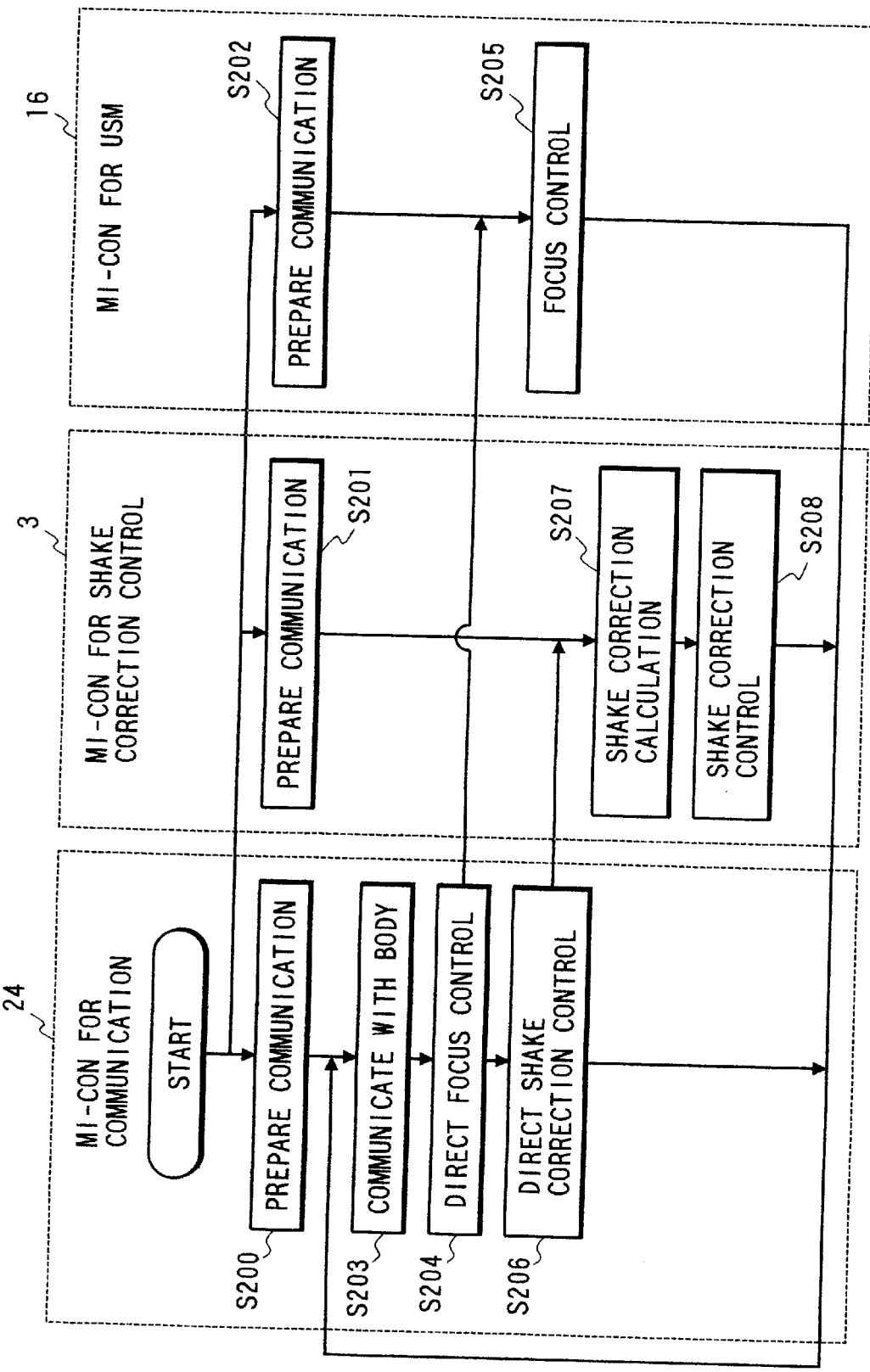
FIG. 2 is a flowchart of assistance in explaining an operational sequence of the photographing apparatus to which the shake correcting apparatus in the first embodiment is applied.

FIG. 2 is a flowchart of assistance in explaining an operation sequence of the photographing apparatus in the first embodiment.

In step (hereinafter abbreviated to "S") 200, the communication microcomputer 24 makes the preparation for the communications. At the same time, the shake correction control microcomputer 3 makes the preparation for the communications in S201, and the ultrasonic motor microcomputer 16 makes the preparation for the communication in S202.

In S203, the communication microcomputer 24 communicates with the body device 2 via the lens terminal 4.

In S204, a focusing control indication given from the body device is transferred to the ultrasonic motor microcomputer 16.

In S205, the ultrasonic motor microcomputer 16 executes the focusing control on the basis of the data from the zoom encoder 22, the distance encoder 15, etc.

In S206, a shake correcting control indication or a lock related control indication (a lock control indication or an unlock control indication) is transferred to the shake correcting control microcomputer 3.

In S207, the shake correcting control microcomputer 3 performs shake correction arithmetic.

In S208, the shake correcting control microcomputer 3 executes the shake correcting control indication or the lock related control indication (the lock control indication or the unlock control indication).

Figure 4:
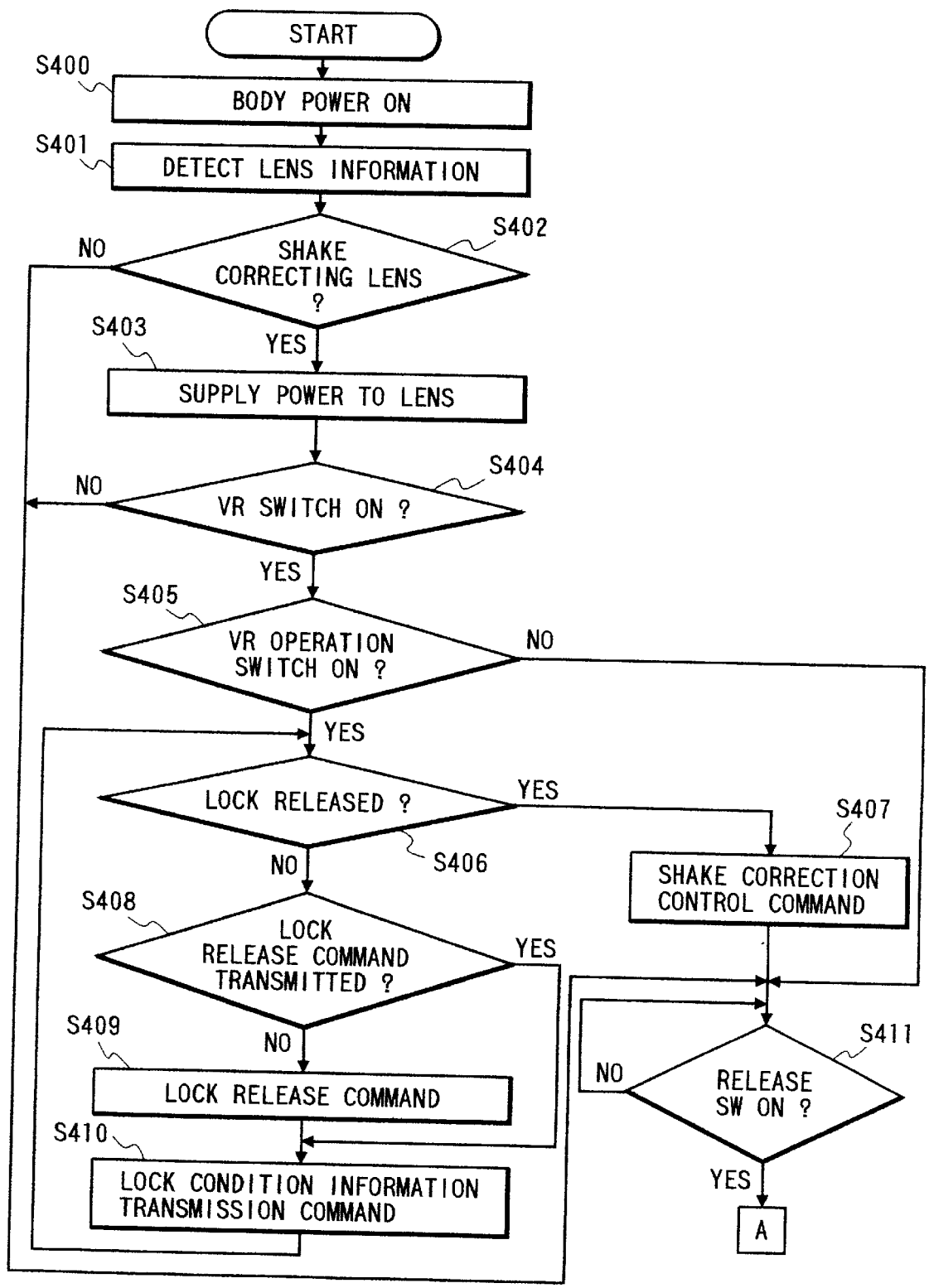
FIG. 4 is a flowchart of assistance in explaining an operational sequence till a shake correcting control command after finishing film exposure control is transmitted to a lens device with respect to lock-related control and shake correcting control of a body device of the present invention.
Figure 5:
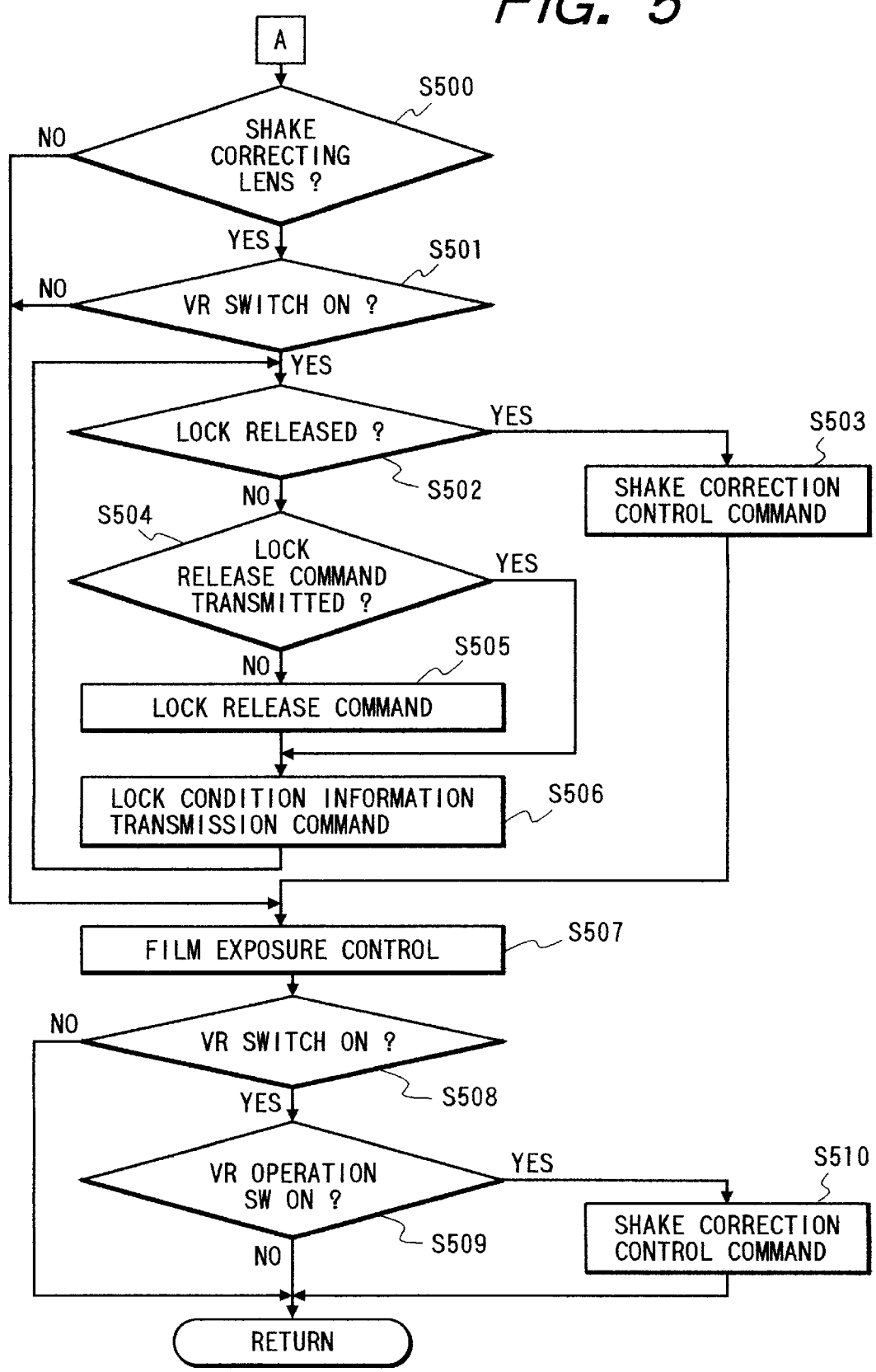
FIG. 5 is a flowchart of assistance in explaining an operational sequence till a shake correcting control command after finishing the film exposure control is transmitted to the lens device with respect to the lock-related control and the shake correcting control of the body device of the present invention.

FIGS. 4 and 5 are both flowcharts showing the operating sequence down to a process of transmitting to the lens device 2 the shake correcting control instruction after finishing the film exposure control with respect to the lock related control and the shake correcting control of the body device 2 in the first embodiment.

In S400 in FIG. 4, the body device 2 activates the power supply circuit within the body device 2 by turning ON a body power supply switch and proceeds to S401.

In S401, the body device 2 communicates with the lens device 1 via the lens terminal 4, detects an item of lens data and proceeds to S402.

In S402, the body device 2 determines whether or not the lens device 1 attached to the body device 2 is a shake correcting function corresponding lens on the basis of the lens data obtained in S401. If determined to be the shake correcting function corresponding lens, the body device 2 proceeds to S403. Whereas if not, the body device proceeds to S411.

In S403, the body device 2 supplies the lens device 1 with the electric power and proceeds to S404.

In S404, the body device 2 determines whether a shake correcting control mode (VR switch) is set ON or not. If the VR switch is turned ON (in the case of a shake correcting control execution mode), the process proceeds to S405. Whereas if the VR switch is not turned ON (in the case of a shake correcting control non-execution mode), the processing proceeds to S411.

Herein, Table 1 shows an itemized content of the control operations in the shake correcting control mode (VR switch).

TABLE 1

| VR Switch | ON | OFF |
|---|---|---|
| Control Operation | Shake Correcting Control Execution (Shake Correcting Control During Film Exposure, Which Is Done By VR Operation Switch Excluding Duration Of Film Exposure) | Shake Correcting Control Non-Execution |

S405 its determined whether the VR operation switch is turned ON or not. If the VR operation switch is turned ON, the processing proceeds to S406. Whereas if not turned ON, the processing proceeds to S411.

Herein, Table 2 shows an itemized content of the control operation by the VR operation switch.

TABLE 2

| VR Operation Switch | ON | OFF |
|---|---|---|
| Control Operation | Shake Correcting Control Execution | Shake Correcting Control Non-Execution |

In S406, the body device 2 determines whether or not the lock magnet 29 defined as the lock unit of the shake correcting optical system that is built in the lens device 2 is an unlocked state on the basis of the lens data obtained in S401. If the lock magnet 29 is in the unlocked state, the processing proceeds to S407. Whereas if not in the unlock state, the processing proceeds to S408.

In S407, the body device 2 transmits the shake correcting control command to the lens device 1.

In S408, the body device 2 checks whether or not the body device 2 has already transmitted an unlock command to the lens device 1. If the unlock command has already been transmitted, the processing proceeds to S410. Whereas if not, the processing proceeds to S409.

In S409, the body device 2 transmits the unlock command to the lens device 1.

In S410, the body device 2 transmits a locked state data transmitting instruction to the body device 2.

In S411, the body device 2 determines whether or not there is turned ON the release switch through which the photographer gives a start-of-exposure command. If the release switch is turned ON, the processing proceeds to A (S500). Whereas if not turned ON, the step S411 is repeatedly executed.

In S500 in FIG. 5, the body device 2 determines whether or not the lens device 2 attached to the body device 2 is the shake correcting function corresponding lens on the basis of the lens data obtained in S401. If the lens device 2 is determined to be the shake correcting function corresponding lens, the processing proceeds to S501. Whereas if not, the processing proceeds to S507.

In S501, the body device 2 checks whether or not the shake correcting control mode (VR switch) is set ON. If the VR switch is turned ON (the shake correcting control execution mode), the processing proceeds to S502. Whereas if the VR switch is not turned ON (the shake correcting control non-execution mode), the processing proceeds to S507.

In S502, the body device 2 determines whether or not the lock magnet 29 of the lens device 2 is in the locked state on the basis of the lens data obtained in S401. If in the unlocked state, the processing proceeds to S503. Whereas if not in the unlocked state, the processing proceeds to step S504.

In S503, the body device 2 transmits the shake correcting control command to the lens device 1.

In S504, the body device 2 checks whether or not the unlock command has already been transmitted to the lens device 1. If the same command has already been transmitted, the processing proceeds to S506. Whereas if not, the processing proceeds to S505.

In S505, the body device 2 transmits the unlock command back to the lens device 1.

In S506, the body device 2 transmits a locked state data retransmitting command to the lens device 1.

In S507, the body device 2 controls the film exposure.

In S508, whether or not the VR switch is turned ON is checked. If the VR switch is turned ON, the processing proceeds to S509. Whereas if not turned ON, the processing returns.

In S509, the body device 2 checks whether or not the VR operation switch is turned ON. If the VR operation switch is turned ON, the processing proceeds to S510. Whereas if not turned ON, the processing returns.

Thus, according to the photographing apparatus to which the shake correcting apparatus in the first embodiment is applied, there must be a time lag until the unlocked state is completed since the body device 2 has transmitted the unlock command to the lens device 1. Even when a length of this time lag fluctuates depending on operation conditions of the microcomputer of the lens device 1, the body device 2 receives the locked-state data from the lens device 1 and judges the locked state, thereby making it possible to move the shake correcting optical system. Therefore, the body device 2, even in such a case that the shake correcting control is carried out immediately after the unlocking operation, a possibility of executing the shake correcting control before the unlocking operation is eliminated, with the result that no impact as given upon the shake correcting mechanism.

Further, in accordance with the first embodiment, the body device 2 receives the locked-state data from the lens device 1 and judges this locked state, thereby avoiding the impact subsequent to an abrupt activation. Hence, the body device 2 transmits the shake correcting control command to the lens device 1 after a required or longer time has elapsed since the body device 2 transmitted the unlock command to the lens device 1, which method eliminates the possibility of worsening the respondency.

Furthermore, in accordance with the first embodiment, the lens device 1 does not transmit the locked-state data to the body device 2 until the body device 2 commands the lens device 1 to transmit the locked-state data. Hence, the unnecessary locked-state data is never transmitted to the body device 2 from the lens device 1 when the lens which is capable of shake correcting control is attached to the body device and incapable of the shake correcting control. It is therefore feasible to obviate such a drawback that the microcomputer of the body device 2 engages in a time-consuming process for communications with the result that other required processes are to be delayed.

Moreover, the first embodiment adopts such a method that the locked-state data, when unlocked, is updated after the time needed for the unlocking has elapsed since the lock control unit carried out the unlock control. It is therefore feasible to prevent damage to the shake correcting mechanism due to the execution of the shake correcting control before the unlocking process that occurs when the delay of control time is not taken into consideration. Further, the locked-state detection switch is not required, resulting in a reduction in costs.

The shake correcting apparatus according to the present invention is not limited to the embodiment discussed above, and a variety of modifications and changes can be carried out and included in the scope of the present invention. For instance, in accordance with the first embodiment, the explanation has been given by exemplifying the lens device of the single-lens reflex camera in which the lens device and the body device are detachably attached thereto. The present invention can be, however, applied to the lens device of the compact camera in absolutely the same way.

A second embodiment of the present invention will be discussed with reference to the accompanying drawings.

Figure 6:
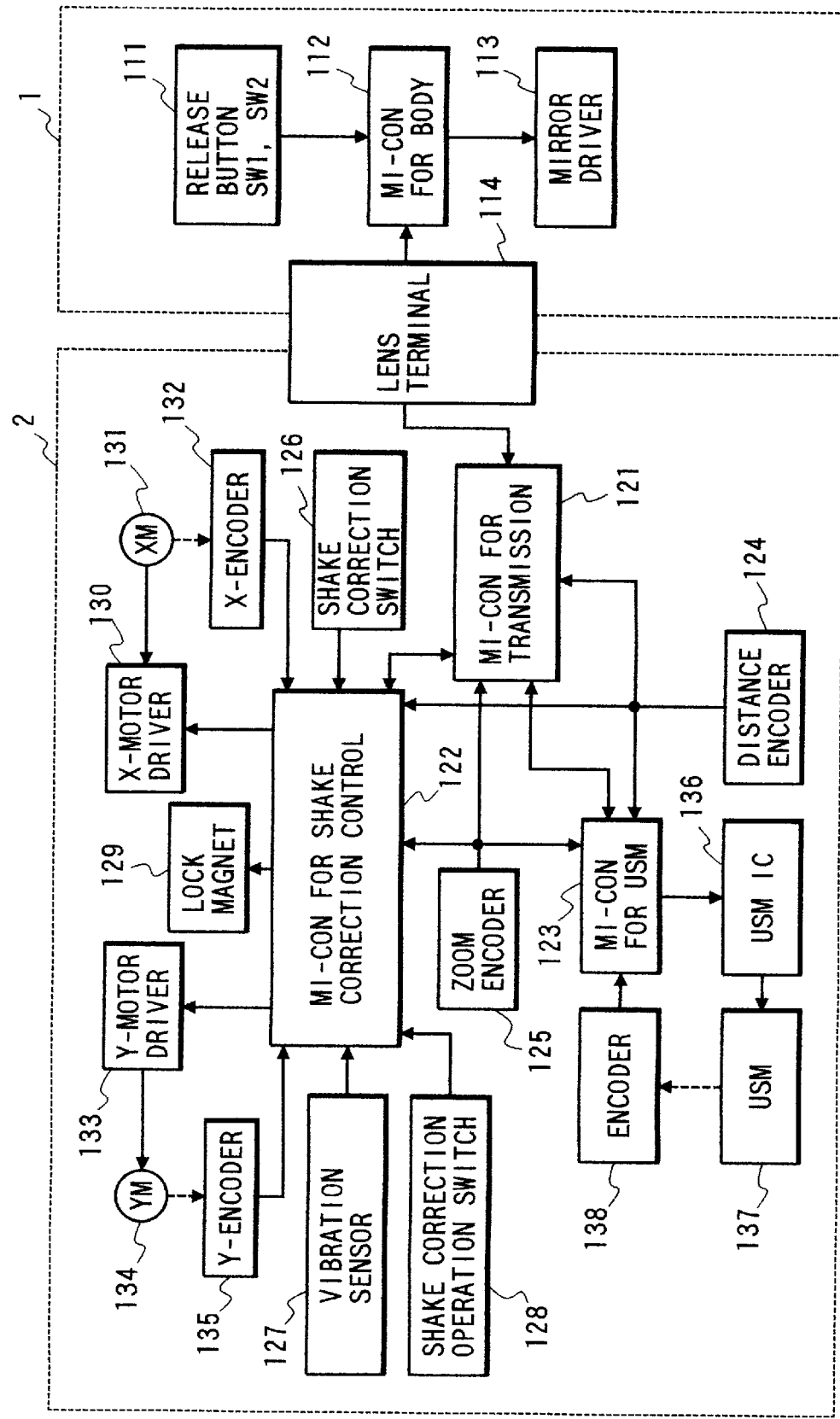
FIG. 6 is a block diagram illustrating a construction of a second embodiment of the present invention.

FIG. 6 is a block diagram illustrating a construction of the second embodiment.

Figure 7:
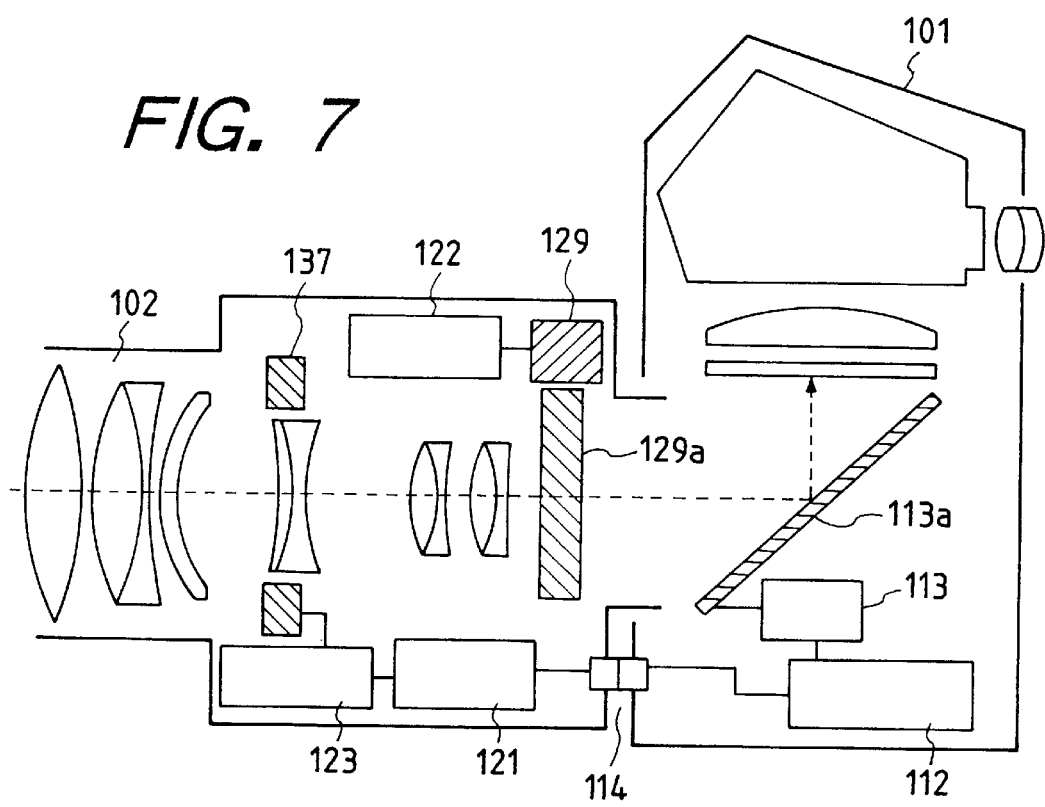
FIG. 7 is a schematic sectional view showing the second embodiment of the present invention.

FIG. 7 is a schematic sectional diagram showing the second embodiment.

Throughout FIGS. 6 and 7, a camera body 101 is provided with a release button 111, and an output of the release button 111 is connected to a microcomputer 112 for the body (which is hereinafter termed a "body microcomputer").

An output terminal of the body microcomputer 112 is connected to a mirror driver 113 for flipping a mirror 113a up and down. A communication terminal of the body microcomputer 112 is connected via a lens terminal 114 to a communication microcomputer 121 on the side of a photographing lens 102.

I/O terminals of the communication microcomputer 121 are individually connected to a shake correcting control microcomputer 122 and an ultrasonic motor microcomputer 123.

A distance encoder 124 is an encoder for detecting a focus position of the photographing lens 102 and converting it into an electric signal, and an output of which is connected to the shake correcting control microcomputer 122, the ultrasonic motor microcomputer 123, and the communication microcomputer 121.

A zoom encoder 125 is an encoder for detecting a focal length of the photographing lens 102 and converting it into an electric signal, and an output of which is connected to the shake correcting control microcomputer 122, the ultrasonic motor microcomputer 123, and the communication microcomputer 121.

A shake correcting switch 126 is a switch for setting whether or not a shake should be corrected during the film exposure, and an output of which is connected to the shake correcting control microcomputer 122.

A vibration sensor 127 is a sensor circuit for detecting a shake quantity of the camera, and an output of which is connected to the shake correcting control microcomputer 122. Note that the vibration sensor 127 may involve the use of, e.g., an angular sensor.

A shake correcting operation switch 128 is a switch for setting whether or not the shake should be corrected during a period exclusive of the film exposing period, and output of which is connected to the shake correcting control microcomputer 122.

A correcting optical system 129a is an optical element so disposed on the optical axis of the photographing lens 102 as to be tiltable.

A lock magnet 129 is an electromagnetic magnet provided for locking a motion of the correcting optical system 129a, and an input of which is connected to the shake correcting control microcomputer 122. Note that the correcting optical system 129a is in a movable state during electrification of the lock magnet 129 and is in a fixed state during non-electrification thereof.

Connected further to the shake correcting control microcomputer 122 are an X-motor 131 and an X-motor driver 130 for moving the correcting optical system 129a in the X-axis direction. A drive quantity of this X-motor 131 is detected by an X-encoder 132 and is then inputted to the shake correcting control microcomputer 122.

Connected similarly to the shake correcting control microcomputer 122 are a Y-motor 134 and a Y-motor driver 133 for moving the correcting optical system 129a in the Y-axis direction. A drive quantity of this Y-motor 134 is detected by a Y-encoder 135 and is then inputted to the shake correcting control microcomputer 122.

Connected also to the ultrasonic motor microcomputer 123 are an ultrasonic motor 137 and an ultrasonic motor IC 136 for adjusting a focus of the photographing lens 102. A drive quantity of this ultrasonic motor 137 is detected by an encoder 138 and is then inputted to the ultrasonic motor microcomputer 123.

Figure 8:
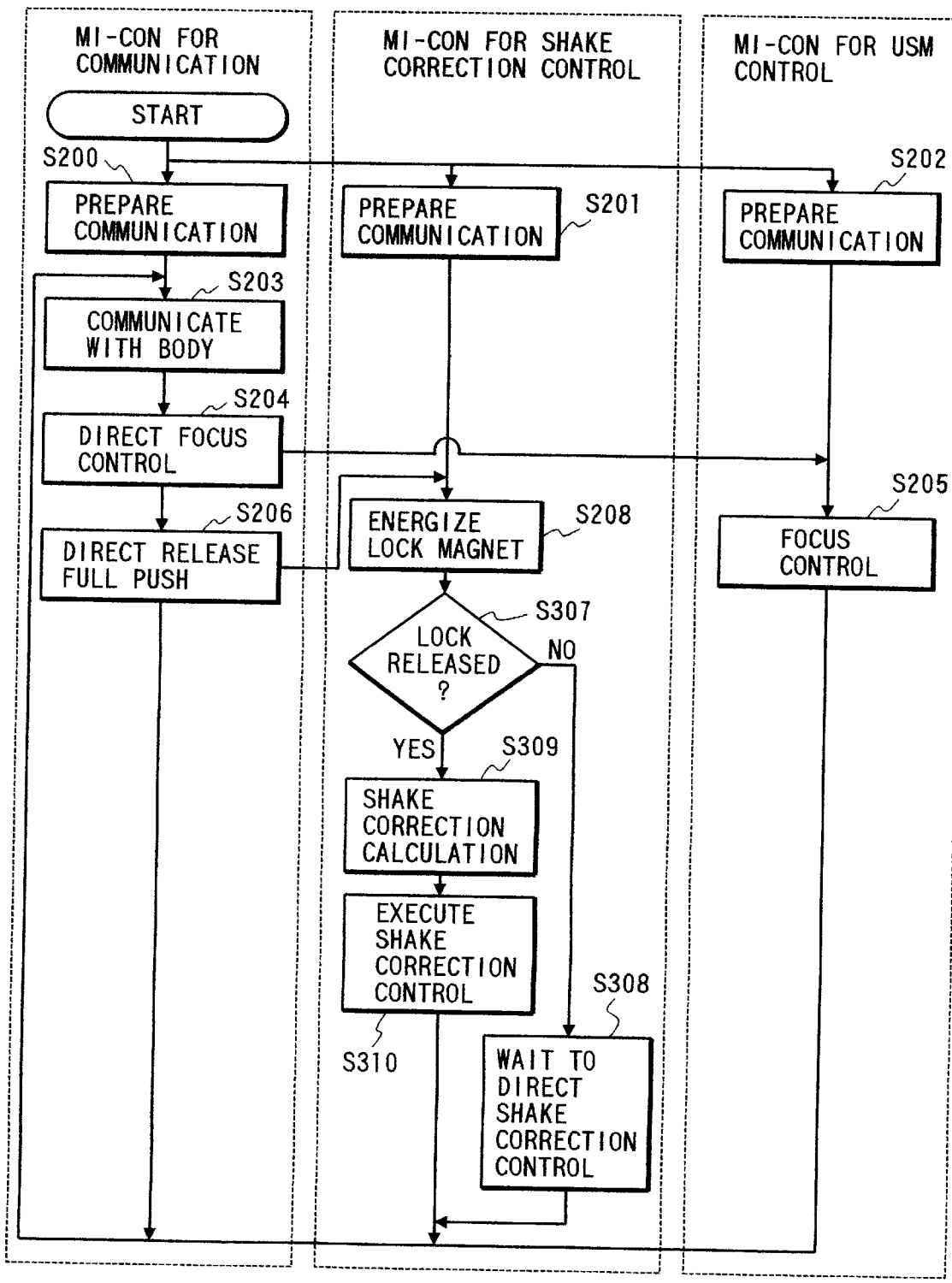
FIG. 8 is a flowchart showing the operation in a third embodiment of the present invention.

FIG. 8 is a flowchart showing the operation of a third embodiment.

The operation of the third embodiment will hereinafter be described with reference to FIGS. 6 through 8.

When the photographing lens 102 is supplied with the electric power, the communication microcomputer 121 starts preparing the communication (S200). With this preparation for the communication, the shake correcting control microcomputer 122 and the ultrasonic motor microcomputer 123 also start preparing the communications (S201, S202).

Upon a completion of these preparations for the communications, the communication microcomputer 121 starts communicating with a camera body 101 via a lens terminal 114 (S203).

Herein, upon receiving the focusing control indication from the camera body 101 (S204), the focusing control indication is transferred to the ultrasonic motor microcomputer 123. The ultrasonic motor microcomputer 123 performs the focusing control on the basis of the data of the zoom encoder 125 and of the distance encoder 124.

On the other hand, when fully pushing the release button 111 on the side of the camera body 101, the camera body 101 gives a release full-push indication to the communication microcomputer 121 (S206).

On receiving this release full-push indication, the shake correcting control microcomputer 122, when the shake correcting switch 126 is turned ON, there is set a flag of the shake correcting control indication for indicating that the shake correcting control is on the execution.

Based on this shake correcting control indication, the shake correcting control microcomputer 122 starts electrifying the lock magnet 129 (S208).

Subsequently, the shake correcting control microcomputer 122 at first slightly drives the X-motor 131. Thereafter, a movement quantity of the correcting optical system 129a is detected through the X-encoder 132. Herein, if the correcting optical system 129a is moved by the drive of the X-motor 131, the correcting optical system 129a is determined to be in the unlocked state.

On the other hand, if the correcting optical system 129a is not moved, the correcting optical system 129a is determined to be in the locked state.

Herein, if determined to be in the locked state (S307), the execution of the shake correction is temporarily halted while holding the above shake correcting control indication. In this state, the processing returns to S203, wherein the focusing control is gain executed, and the detection of the locked state in S307 is repeated based on the held shake correcting control indication.

On the other hand, if determined to be in the unlocked state (S307), the shake correcting control microcomputer 122 drives the X-motor 131 and the Y-motor 134 on the basis of an output of the vibration sensor 127, and then executes the correction of the shake (S308, S309). After executing the film exposure in the thus shake-corrected state, the processing returns to S203 to get ready for a next photography.

Thus, in accordance with the third embodiment, if the unlocking operation of the correcting optical system 129a is uncompleted, neither the X-motor 131 nor the Y-motor 134 is driven. Hence, it is feasible to surely avoid such a situation that the shake correction is executed while the correcting optical system 129a remains locked.

In particular, the correcting optical system 129a is always in the locked state due to a trouble pertaining to a power supply system, in which case the shake correction does not start till this trouble is obviated. Therefore, it is possible to safely certainly avoid the worst condition in which the camera is damaged.

Further, the shake correction can immediately start after the correcting optical system 129a is unlocked. It is therefore feasible to reduce the time till the shake correction is started since the correcting optical system 129a was unlocked with a simple construction. Thus, a period for which a force for restricting the movement of the correcting optical system 129a does not work, is reduced, whereby impactive vibrations are exerted on the camera during this period. It is therefore feasible to remarkably reduce the possibility in which the correcting optical system 129a might be damaged.

Next, a fourth embodiment will be discussed.

Figure 9:
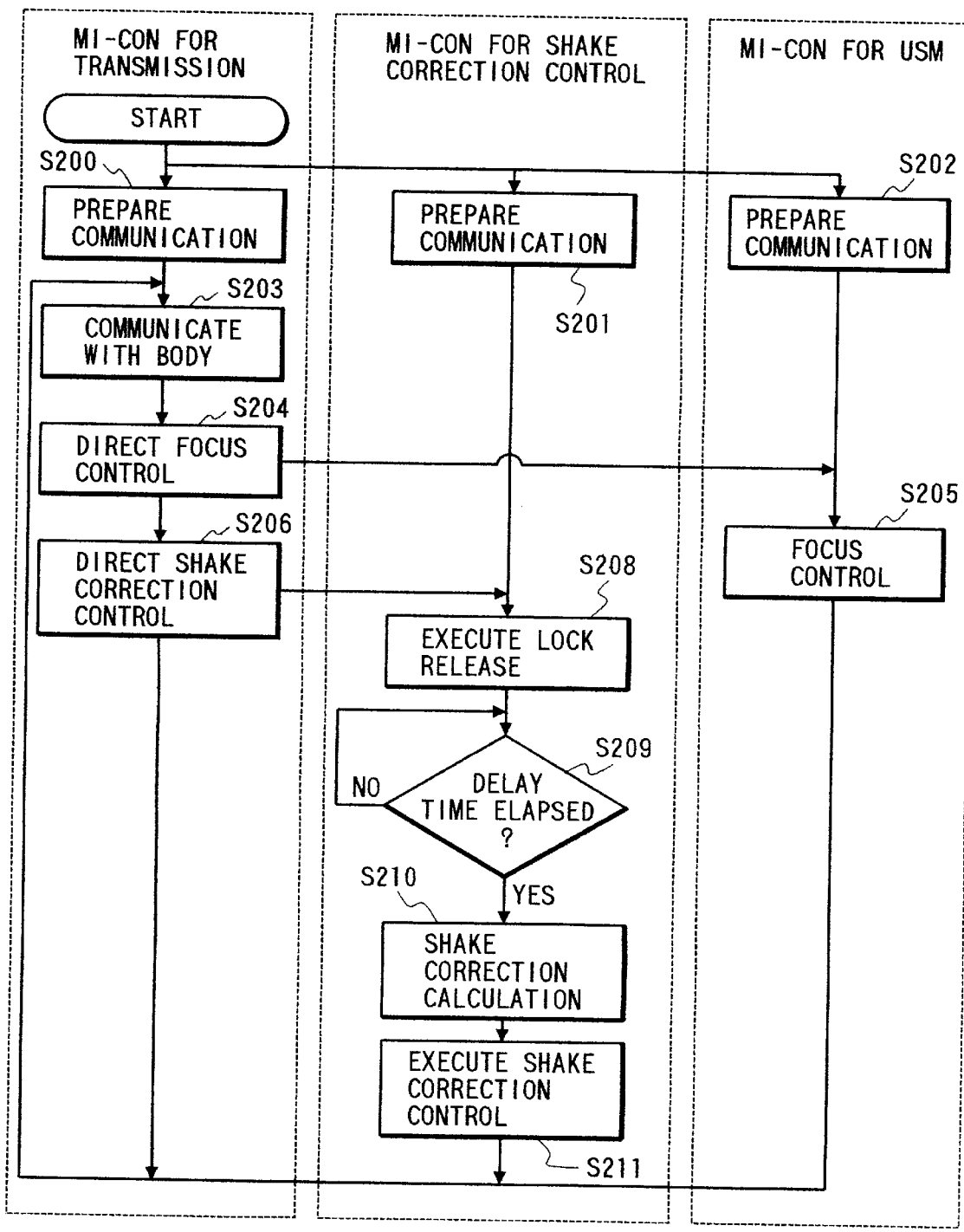
FIG. 9 is a flowchart showing the operation in a fourth embodiment of the present invention.

FIG. 9 is a flowchart showing the operation of the fourth embodiment.

Note that the constructive elements in the fourth embodiment are the same as those in the embodiment discussed above and therefore marked with the identical reference numerals, with the explanation being omitted herein.

The operation of the fourth embodiment will be described with reference to FIGS. 6, 7 and 9.

When the photographing lens 102 is supplied with the electric power, the communication microcomputer 121 starts preparing the communication (S200). With this preparation for the communication, the shake correcting control microcomputer 122 and the ultrasonic motor microcomputer 123 also start preparing the communications (S201, S202).

Upon a completion of these preparations for the communications, the communication microcomputer 121 starts communicating with the camera body 101 via the lens terminal 114 (S203).

Herein, upon receiving the focusing control indication from the camera body 101 (S204), the focusing control indication is transferred to the ultrasonic motor microcomputer 123. The ultrasonic motor microcomputer 123 performs the focusing control on the basis of the data of the zoom encoder 125 and of the distance encoder 124.

Further, upon receiving the shake correcting control indication from the camera body 101 (S206), the shake correcting control microcomputer 122 starts electrifying the lock magnet 129 (S208). After awaiting till a predetermined delay time elapses since the above electrification was started, the shake correcting control microcomputer 122 judges that the unlocking is completed and therefore executes the shake correction (S210, S211). After performing the film exposure in this state, the processing returns to S203 to get ready for the next photography.

Thus, in the embodiment discussed above, the determination of the completion of unlocking is made after the predetermined time has elapsed since the unlocking operation started. Hence, there is no necessity for directly detecting the state of the lock magnet 129. Accordingly, a sensor for detecting the locked state is not required to be disposed, and the unlocking can be extremely easily determined.

Further, in accordance with the shake correcting control indication from the camera body 101, the photographing lens 102 unlocks the correcting optical system 129a as a preparation for starting the shake correction, and hence it is possible to omit a complicated process for individually synchronizing an operation timing of starting the shake correction and the unlocking.

Further, there is no necessity for judging the locked-state or transferring the locked-state to the camera body 101. Hence, the time needed therefor is saved, whereby the respondency to the shake correction can be enhanced.

Note that the embodiment discussed above has dealt with the case of executing the shake correcting control, but the present invention is not confined to the above-mentioned. As in the case of the shake correction, a start timing of the locating control may be determined.

Moreover, the embodiment discussed above has dealt with the case where the shake is corrected by moving the correcting optical system, but the present invention is not limited to the above-mentioned. In the shake correcting apparatus for correcting the shake by moving, e.g., exposure surfaces of a photosensitive element and an imaging element, the start timing of the locating control or the shake correction may be determined as in the same way with the above-described embodiment by detecting the locked states of these exposure surfaces.

As discussed above, according to the present invention, if the unlocking is not incomplete in the correcting optical system and other movable portions, it is possible to surely avoid such a situation that the shake correction is to be executed while being in the locked state by starting no movement of the movable portion.

Particularly, if the movable portion is in the ever-locked state due to the trouble in the power supply system, the shake correction is not executed till this trouble is obviated. Therefore, it is feasible to stably certainly avoid the worst condition in which the camera might be damaged.

According to the present invention, the shake correction is started after awaiting the unlocking of the movable portion. It is therefore feasible to easily reduce the time up to the start of the shake correction since the movable portion has been unlocked. Thus, there is shortened the period for which the force for restricting the movement of the movable portion does not work, thereby making it feasible to remarkably decrease such a possibility that the movable portion might be damaged as a result of the impactive vibrations being exerted upon the camera during that period.

According to the present invention, if the unlocking of the movable portion is incomplete, the locating control of the movable portion is not started, and hence it is possible to surely steer clear of such a situation that the locating control is executed while being in the locked state without starting the locating control of the movable portion.

Particularly, if the movable portion is in the ever-locked state due to the trouble in the power supply system, the locating control is not executed till this trouble is obviated. Therefore, it is feasible to stably certainly avoid the worst condition in which the camera might be damaged.

According to the present invention, the locating control is started after awaiting the unlocking of the movable portion. It is therefore feasible to easily reduce the time up to the start of the locating control since the movable portion has been unlocked. Thus, there is shortened the period for which the force for restricting the movement of the movable portion does not work, thereby making it feasible to remarkably decrease such a possibility that the movable portion might be damaged as a result of the impactive vibrations being exerted upon the camera during that period.

According to the present invention, after the predetermined time has elapsed since the unlocking operation was started, the completion of the unlocking is determined. Hence, there is no necessity for directly detecting the state of the locking element. Accordingly, the sensor for detecting the locked state is not required to be disposed, and the unlocking can be extremely easily determined.

According to the present invention, the shake correcting element releases the locking by the locking element as a preparation for starting the shake correction, and, therefore, it is feasible to omit the complicated process for individually synchronizing the operation timing of starting the shake correction and the unlocking.

Further, there is also no necessity for determining the locked state or transferring the locked-state data. Hence, the time needed therefor can be saved, and the respondency to the shake correction can be enhanced.

According to the present invention, the locating element releases the locking by the locking element as a preparation for starting the locating control, and it is therefore possible to omit the complicated process for individually synchronizing the operation timing of starting the locating control and the unlocking.

Moreover, there is also no necessity for determining the locked state or transferring the locked-state data. Hence, the time needed therefor can be saved, and the respondency to the locating control can be enhanced.

As discussed above, in the shake correcting apparatus to which the present invention is applied, the start timing of the locating control or the shake correction can be safely certainly determined with the simple construction.

Further, in the corresponding relationship between the embodiment discussed referring to FIGS. 6 and 7 and the invention of the present application, the movement detecting element corresponds to the vibration sensor 127; the shake correcting element corresponds to the shake correcting control microcomputer 122, the X-motor driver 130, the X-motor 131, the X-encoder 132, the Y-motor driver 133, the Y-motor 134 and the Y-encoder 135; and the locking element corresponds to the body microcomputer 112, the shake correcting control microcomputer 122 and the lock magnet 129.

Figure 10:
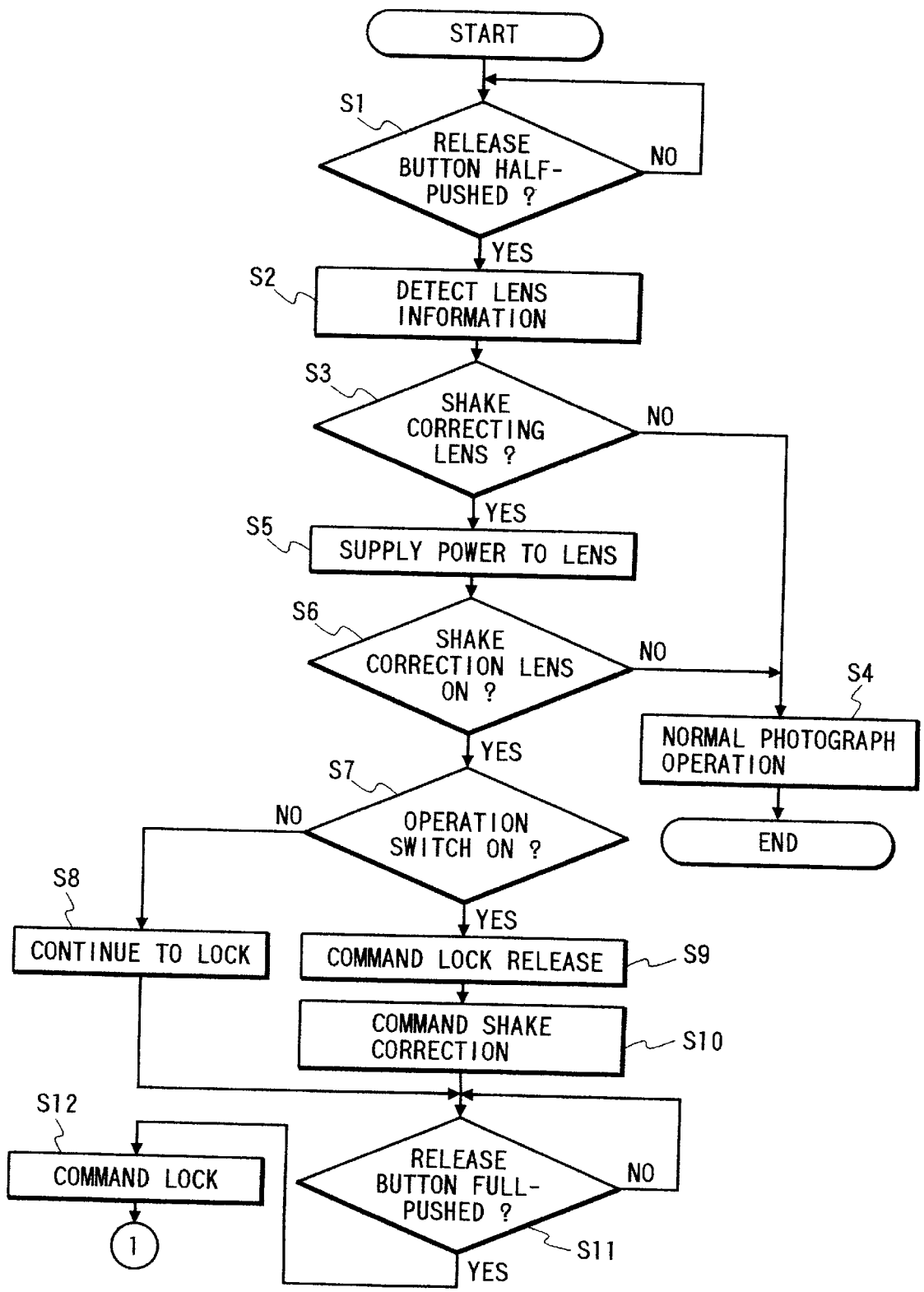
FIG. 10 is a flowchart (1) showing the operation in a fifth embodiment of the present invention.
Figure 11:
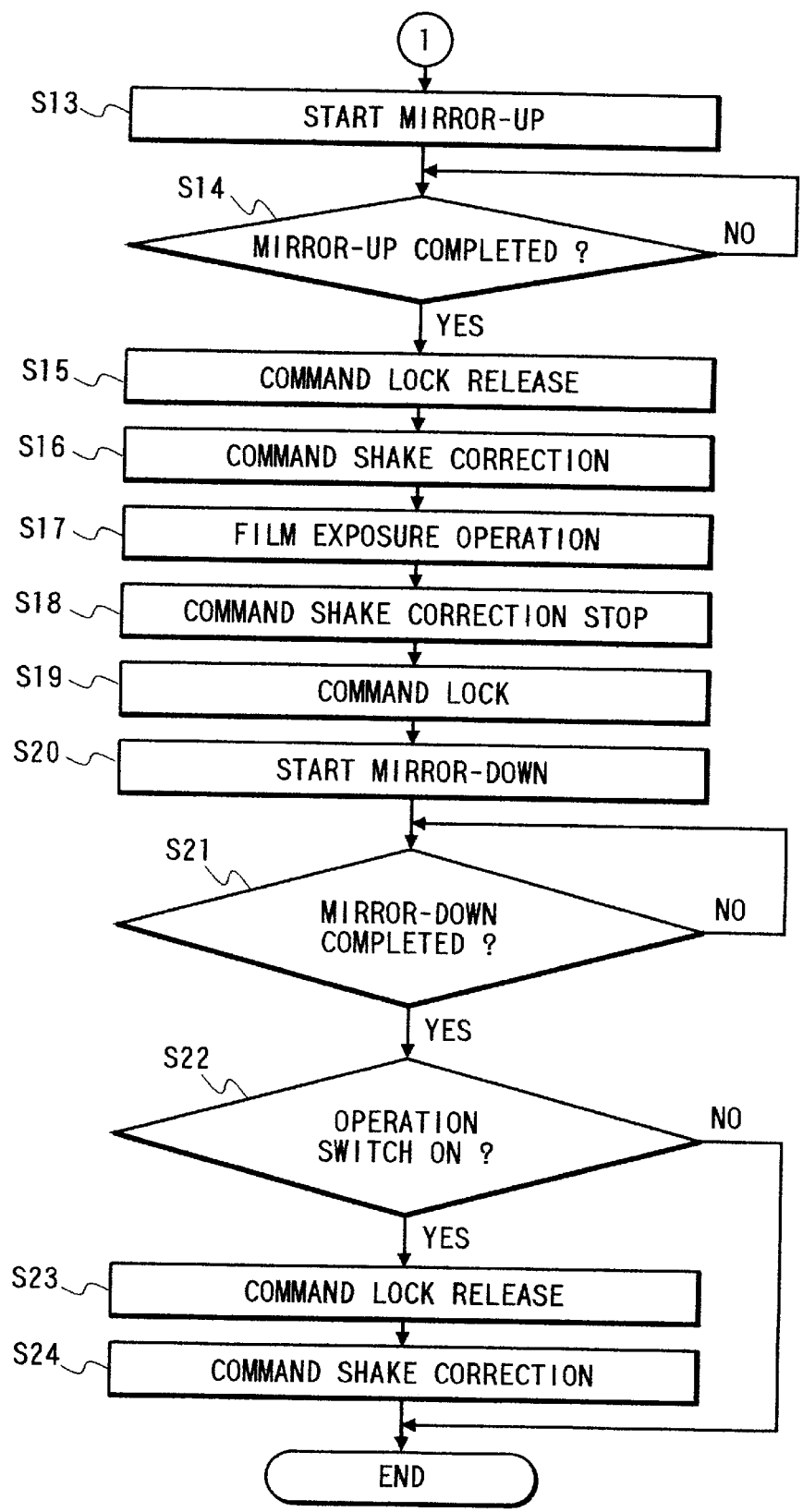
FIG. 11 is a flowchart (2) showing the operation in the fifth embodiment of the present invention.

FIGS. 10 and 11 are flowcharts showing the operation of a fifth embodiment.

Figure 12:
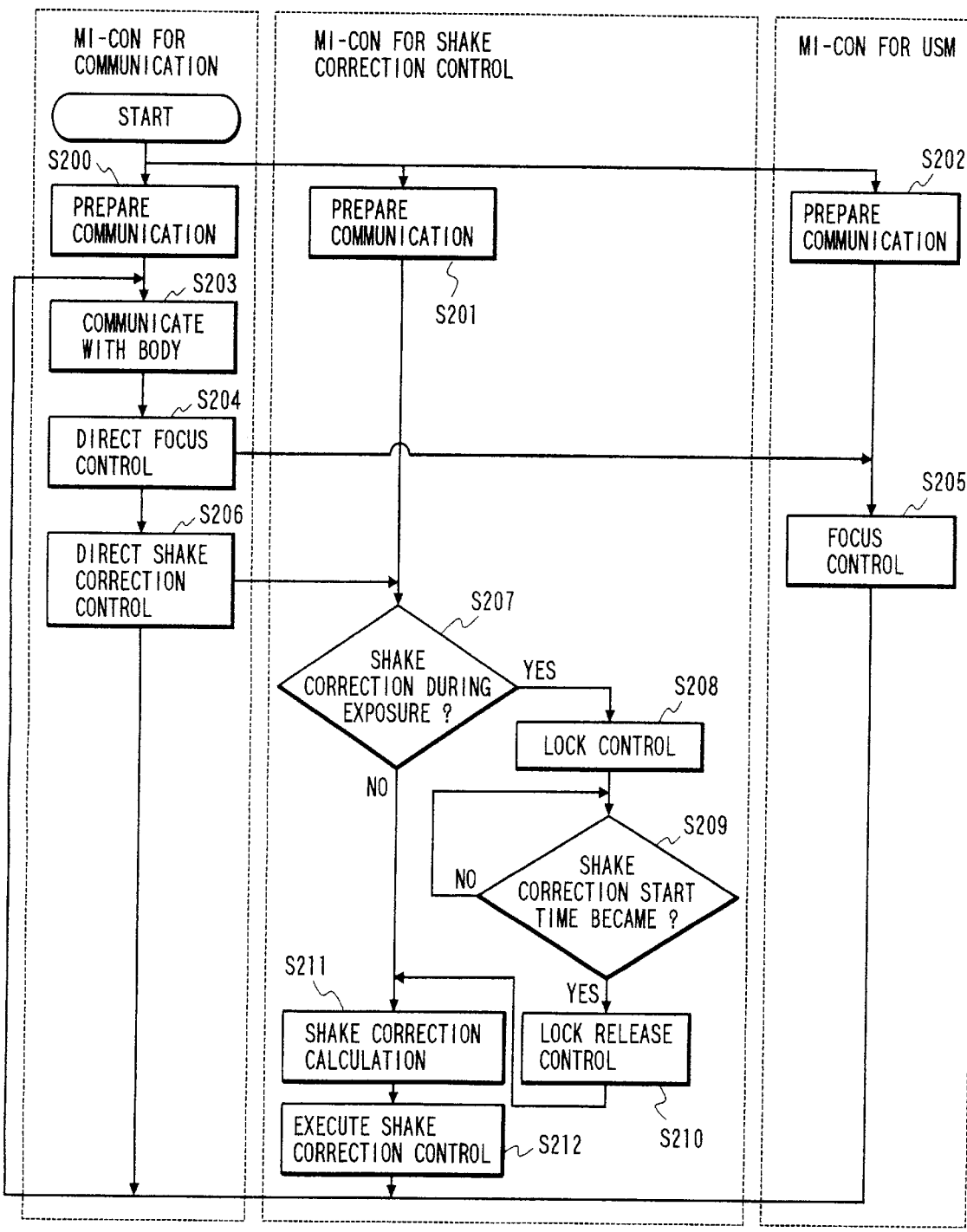
FIG. 12 is a diagram showing the operation on the lens side in the fifth embodiment of the present invention.

FIG. 12 is a diagram showing the operation on the side of the lens device in the fifth embodiment.

The fifth embodiment will hereinafter be described with reference to FIGS. 10 through 12.

When the release button 111 is half-pushed (step S1), the body microcomputer 112 takes in the lens data (step S2) and checks whether or not the lens incorporates the shake correcting function from this item of lens data (step S3).

In the case of the photographing lens 102 having no shake correcting function, the processing shifts to the normal photographing operation (step S4). In the case of the photographing lens 102 having the shake correcting function, the photographing lens 102 is supplied with the electric power (step S5).

In this state, the shake correcting control microcomputer 122 checks whether or not the shake correcting switch 126 provided in the photographing lens 102 is in the ON-status, and transfers a result of checking to the body microcomputer 112 via the lens terminal 114 (step S6).

When the shake correcting switch 126 is in the OFF-status, there is no need for correcting the shake during the film exposure, and, therefore, the processing shifts to the normal photographing operation (step S7).

When the shake correcting switch 126 is in the ON-status, the shake correcting control microcomputer 22 determines whether or not the shake correcting operation switch 128 provided in the photographing lens is in the ON-status, and transfers a result of determination to the body microcomputer 112 (step S7).

When the shake correcting operation switch 128 is in the OFF-status, the shake correction is not executed during a period excluding the film exposure period. Then, the shake correcting control microcomputer 122 continues to cut off the electrification of the lock magnet 129, thus making the correcting optical system 129a remain locked (step S8).

On the other hand, when the shake correcting operation switch 128 is in the ON-status, the shake correcting control microcomputer 122 unlocks the correcting optical system 129a (step S9) and executes the shake correction (step S10).

Next, the body microcomputer 112 awaits till the release button 111 is fully pushed (step S11).

When the release button 111 is fully pushed, the body microcomputer 112 gives the lock command to the photographing lens 102. The shake correcting control microcomputer 122 cuts off the electrification of the lock magnet 129 at such a timing as to receive this lock command, thus forcibly locking the correcting optical system 129a (step S12).

Thus, in the locked-state of the correcting optical system 129a, the body microcomputer 112 starts flipping up the mirror through the mirror drive unit 113 (step S13).

The body microcomputer 112, after completing the mirror-up (step S14), issues the unlock command to the photographing lens 102. The shake correcting control microcomputer 122 electrifies the lock magnet 129 at a timing when receiving the unlock command, thus unlocking the correcting optical system 129a (step S15).

Subsequently, the shake correcting control microcomputer 122 drives the X- and Y-motors 131, 134, thereby moving the unlocked correcting optical system 129a. The shake correction is thus executed (step S16).

In such a state, the body microcomputer 112 executes the film exposing operation (step S17).

Upon finishing the film exposing operation, the body microcomputer 112 imparts a stop command of the shake correction to the photographing lens 102. The shake correcting control microcomputer 122 stops the shake correction at a time when receiving this stop command (step S18).

Subsequently, the shake correction control microcomputer 122 locks the correcting optical system 129a (step S19).

Thus, in the locked state of the correcting optical system 129a, the body microcomputer 112 starts flipping down the mirror through the mirror drive unit 113 (step S20).

Normally, in the locked state of the correcting optical system 129a, there is a wait till the next photography comes. When the shake correcting operation switch 128 is turned ON, however, the correcting optical system 129a is unlocked after a completion of the mirror-down, thereby making the shake correction resume (steps S22–S24).

With the operation given above, for the duration of the mirror-up and -down of the mirror 113a, the correcting optical system 129a is forcibly locked.

Accordingly, the correcting optical system 129a can be surely prevented from being damaged without any vibrations of the correcting optical system 129a due to impactive vibrations subsequent to the mirror-up and -down of the mirror 113a.

Further, the shake correction can be started during the film exposure in a state where free vibrations of the correcting optical system 129a are restrained by locking the correcting optical system 129a when flipping up the mirror. Hence, a setting time for the shake correcting control is effectively reduced, whereby a picture with a less image blur can be obtained by the photographing.

Note that the body microcomputer 112 outputs the lock and unlock commands and thereby controls the locked-state of the correcting optical system 129a in the embodiment discussed above, but the present invention is not limited to the above-mentioned. For instance, in the photographing lens 102, the terminal data of the release button 111 and other data are fetched out of the camera body 101, and the "mirror-up and -down timings" are judged or presumed based on those items of data. The lock control of the correcting optical system 129a may be thus performed.

Further, in accordance with the embodiment discussed above, the lock and unlock commands are given, and these commands are executed irrespective of the locked-state of the correcting optical system 129a. The present invention is not, however, confined to the above-mentioned. For example, there is provided a lock monitoring element for detecting the locked-state and determining a present locked-state from hysteresis of the locked-state, whereby a command that is invalid enough not to change the locked-state is not issued, or this invalid command is not executed.

Further, the embodiment discussed above has dealt with the case where the shake correction is attained by moving the correcting optical system. The present invention is not, however, confined to the above-mentioned. For instance, in the shake correcting apparatus for correcting the shake by moving the exposure surfaces of the imaging element and the photosensitive member, these exposure surfaces may be locked during the mirror-up and -down period.

As discussed above, according to the present invention, the shake correction movable portion is locked during the period up to the time before starting the exposure of the imaging surface since the photographing preparatory operation of the camera was started. It is therefore possible to surely prevent the movable portion from being damaged without any vibrations of the movable portion due to the shake caused in the camera during such a period.

Further, the shake correction can be started during the exposure in the state where the free vibrations of the movable portion are restrained, and hence the setting time for the shake correcting control can be remarkably reduced.

According to the present invention, the shake correction movable portion is locked during the mirror-up period in the camera, and hence it is feasible to certainly prevent the damage to the movable portion without any vibrations of the movable portion due to the vibrations caused by the mirror-up.

Moreover, the shake correction can be started after flipping up the mirror in the state where the free vibrations of the movable portion due to the mirror-up are restrained, and hence the setting time for the shake correcting control can be outstandingly decreased.

According to the present invention, since the shake correction movable portion is locked after finishing the exposure in the camera, the movable portion never vibrates due to the camera shake caused for preparing for the next photography, and the damage to the movable portion can be surely prevented.

According to the present invention, the shake correction movable portion is locked during the mirror-down period in the camera, and it is therefore feasible to surely prevent the movable portion from being damaged without any vibrations of the movable portion due to the vibrations produced by the mirror-down.

Accordingly, in the camera mounted with the shake correcting apparatus of the present invention, it is possible to remarkably extend a life-span of the shake correcting mechanism by certainly preventing the damage to the shake correcting mechanism due to the shake caused when photographing while decreasing the setting time for the shake correction.

It is apparent that, in this invention, a wide range of different working modes can be formed based on the invention without deviating from the spirit and scope of the invention. This invention is not restricted by its specific working modes except being limited by the appended claims.

What is claimed is:

1. A shake correcting apparatus to correct shake in a photographing apparatus, comprising:

a shake detecting device disposed within a lens device for detecting shake of the photographing apparatus and outputting a corresponding signal;

a shake correcting optical system disposed within the lens device to correct camera shake;

a shake correction moving device disposed within the lens device and correcting shake of the photographing apparatus by moving the shake correcting optical system in response to the output signal from said shake detecting device;

a lock device disposed within the lens device for locking said shake correcting optical system in a predetermined position; and a control device disposed within a body device for controlling said shake correction moving device and said lock device, wherein said control device inhibits operation of said shake correction moving device by holding transmission of a shake correction drive request until receipt of data indicating that the lock device is unlocked, and thereby prevents damage to the photographing apparatus through movement of said shake correcting optical system during lock by said lock device.

2. A shake correcting apparatus to correct shake in a photographing apparatus, comprising:

a shake detecting device, disposed within a lens device, for detecting shake in the photographing apparatus and outputting a corresponding shake detection signal;

a shake correcting optical system disposed within the lens device to correct camera shake;

a shake correction moving device disposed within the lens device for correcting shake produced in the photographing apparatus by moving the shake correcting optical system in response to the shake detection signal output from said shake detecting device;

a lock device disposed within the lens device for locking said shake correcting optical system in a predetermined position;

a locked-state detecting device disposed within the lens device for detecting a locked-state of said shake correcting optical system and outputting corresponding locked-state data; and a control device disposed within a body device for controlling said shake correction moving device, wherein said control device outputs a permission signal to said shake correction moving device for permitting operation of said shake correction moving device in response to receiving the locked-state data from said locked-state detecting device.

3. A shake correcting apparatus according to claim 2, wherein said control device controls operation of said lock device by the permission signal.

4. A shake correcting apparatus according to claim 2, wherein said control device does not transmit the permission signal to said shake correction moving device when the locked-state data output from said locked-state detecting device indicates that said shake correcting optical system is locked.

5. A shake correcting apparatus according to claim 2, wherein said control device transmits the permission signal to said shake correction moving device after determining that said shake correcting optical system is in response to the locked-state data output from the said locked-state detecting device.

6. A shake correcting apparatus according to claim 2, wherein said control device ignores a request for shake correction drive when the locked-state data output from said locked-state detecting device indicates that said shake correcting optical system is locked.

7. A shake correcting apparatus according to claim 2, wherein said control device transmits a centering signal to said shake correction moving device to center said shake correcting optical system in a position concentric to an optical axis.

8. A shake correcting apparatus according to claim 7, wherein said control device does not transmit the centering signal to said shake correction moving device in the case of determining that the shake correcting optical system is locked in response to the locked-state data output from said locked-state detecting device when a centering request of said shake correcting optical system is made.

9. A shake correcting apparatus according to claim 7, wherein said control device transmits the centering signal to said shake correction moving device a predetermined period of time after determining that said shake correction moving device is unlocked in response to the locked-state data output from said locked-state detecting device.

10. A shake correcting apparatus according to claim 7, wherein said control device ignores the centering request in the case of determining that the shake correcting optical system is not unlocked on the basis of the locked-state data output from said locked-state detecting device when the centering request of said shake correcting optical system is made.

11. A shake correcting apparatus to correct shake in a photographing apparatus, comprising:
   a shake detecting device disposed within a lens device for detecting shake of the photographing apparatus and outputting a corresponding shake detection signal;
   a shake correcting optical system disposed within the lens device to correct camera shake;
   a shake correction moving device disposed within the lens device and correcting shake of the photographing apparatus by moving said shake correcting optical system in response to the shake detection signal output from said shake detecting device;
   a lock device disposed within the lens device for locking said shake correcting optical system in a predetermined position;
   a lock control device disposed within the lens device for transmitting a drive signal to said lock device and outputting data corresponding to the drive signal; and
   a shake control device disposed within a body device for controlling said shake correction moving device,
   wherein said shake control device outputs a permission signal for permitting shake correction to said shake correction moving device when determining that said shake correcting optical system is unlocked in response to the data output by said lock control device.

12. A shake correcting apparatus according to claim 11, wherein said shake control device does not transmit the permission signal to said shake correction moving device upon determining that said shake correcting optical system is locked.

13. A shake correcting apparatus according to claim 11, wherein said shake control device transmits the permission signal to said shake correction moving device after determining that said shake correcting optical system is unlocked in response to the data output by said lock control device.

14. A shake correcting apparatus according to claim 11, wherein said shake control device ignores a request for shake correction drive in the case of determining that the shake correcting optical system is locked.

15. A shake correcting apparatus according to claim 11, wherein said shake control device transmits a centering signal to said shake correction moving device to center said shake correcting optical system in a position concentric to an optical axis.

16. A shake correcting apparatus according to claim 15, wherein said shake control device does not transmit the centering signal to said shake correction moving device in the case of determining that said shake correcting optical system is locked in response to the data output from said lock control device.

17. A shake correcting apparatus according to claim 15, wherein said shake control device transmits the centering signal to said shake correction moving device after determining that said shake correcting optical system is unlocked in response to the data output from said lock control device.

18. A shake correcting apparatus according to claim 15, wherein said shake control device does not transmit the centering signal when determining that the shake correcting optical system is locked in response to the data output from said lock control device.

19. A shake correcting apparatus according to claim 11, wherein the data output from said lock control device contains information indicating that a command to make said lock device execute the locking operation is issued and that a command to make said lock device execute an unlock operation is issued.

20. A shake correcting apparatus according to claim 11, wherein said lock control device transmits data to make said lock device execute an unlock operation to said shake control device after a predetermined time has elapsed since the drive signal was transmitted.

21. A shake correcting apparatus according to claim 20, wherein the predetermined time is a time up to a completion of the unlock operation by said lock device.

22. A shake correcting apparatus to correct shake in a photographic apparatus, comprising:
   a shake detecting device disposed within a lens device for detecting shake of the photographing apparatus and outputting a corresponding shake detection signal;
   a shake correcting device disposed within the lens device for correcting the shake of the photographing apparatus by moving an optical system or an imaging surface of the photographing apparatus in response to the shake detected signal output from said shake detecting device;
   a lock device disposed within the lens device for locking said optical system or the imaging surface in a predetermined position;
   a locked-state detecting device disposed within the lens device for detecting a locked-state of said optical system or the imaging surface and outputting corresponding locked-state data; and
   a control device disposed within a body device for controlling said shake correcting device and said lock device,
   wherein said shake correcting device stops movement of said optical system or the imaging surface when determining that the lock of said optical system or the imaging surface is incomplete from the locked-state data.

23. A shake correcting apparatus according to claim 22, wherein when said shake correcting device determines that unlocking of said optical system or the imaging surface is completed, said shake correcting device starts moving said optical system or the imaging surface.

24. A shake correcting apparatus according to claim 23, wherein when a predetermined time has elapsed since initiating the unlocking of said optical system or the imaging surface, said shake correcting device determines that the unlocking of said optical system or the imaging surface is completed.

25. A shake correcting apparatus to correct shake in a photographing apparatus, comprising:
a shake detecting device disposed within a lens device for detecting shake of the photographing apparatus and outputting a corresponding shake detection signal;
a shake correcting device disposed within the lens device for correcting the shake detected by said shake detecting apparatus by moving an optical system or an imaging surface of the photographing apparatus in response to the shake detection signal;
a locating device disposed within the lens device for location-controlling the optical system or the imaging surface to a predetermined position;
a lock device disposed within the lens device for inhibiting movement of the optical system or the imaging surface;
a state detecting device disposed within the lens device for detecting a locked-state of the optical system or the imaging surface and outputting corresponding locked-state data; and
a control device disposed within a body device for controlling said shake correcting device and said lock device,
wherein said locating device stops the location-controlling of said optical system or the imaging surface when determining that locating of said optical system or the imaging surface is incomplete from the locked-state data.

26. A shake correcting apparatus according to claim 25, wherein said locating device starts the location-controlling of the optical system or the imaging surface when determining that unlocking of said optical system or the imaging surface is completed on the basis of the locked-state data.

27. A shake correcting apparatus according to claim 26, wherein said shake correcting device determines that the unlocking of said optical system or the imaging surface is completed when a predetermined time has elapsed since initiation of the unlocking of said optical system or the imaging surface.

28. A shake correcting apparatus to correct shake in a photographing apparatus, comprising:
a shake detecting device disposed within a lens device for detecting shake in the photographing apparatus and outputting a corresponding shake detection signal;
a shake correcting device disposed within the lens device for correcting the shake detected by said shake detecting apparatus by moving an optical system or an imaging surface of said photographing apparatus in response to the shake detection signal;
a lock device disposed within the lens device for locking the optical system or the imaging surface in a predetermined position; and
a control device disposed within a body device for controlling said shake correcting device and said lock device,
wherein said shake correcting device, before correcting the shake, unlocks the optical system or the imaging surface by said lock device.

29. A shake correcting apparatus to correct shake in a photographing apparatus, comprising:
a shake detecting device disposed within a lens device for detecting shake in a photographing apparatus and outputting a corresponding shake detection signal;
a shake correcting device disposed within the lens device for correcting the shake caused in said photographing apparatus by moving an optical system or an imaging surface of the photographing apparatus in response to the shake detection signal;
a locating device for location-controlling the optical system or the imaging surface to a predetermined position;
a lock device for inhibiting a movement of the optical system or the imaging surface; and
a control device disposed within a body device for controlling said shake correcting device and said lock device, wherein said locating device cancels the inhibition of the movement of the optical system or the imaging surface by said lock device before locating the optical system or the imaging surface.

30. A shake correcting apparatus to correct shake in a photographing apparatus, comprising:
a shake detecting device disposed within a lens device for detecting shake in the photographing apparatus and outputting a corresponding shake detection signal;
a shake correcting device disposed within the lens device for correcting the shake detected by said shake detecting device by moving an optical system or an imaging surface of said photographing apparatus in response to the shake detection signal;
a lock device for locking said optical system or the imaging surface in a predetermined positions; and
a control device disposed within a body device for controlling said shake correcting device and said lock device,
wherein said shake correcting device inputs timing data about photography from the photographing apparatus and locks the optical system or the imaging surface up to a start of exposure since a photographing preparatory operation of said photographing apparatus was started on the basis of the timing data.

31. A shake correcting apparatus to correct shake in a camera having a mirror, comprising:
a shake detecting device disposed within a lens device for detecting shake in the camera and outputting a corresponding shake detection signal;
a shake correcting device disposed within the lens device for correcting the shake in response to the shake detection signal output from said shake detecting device;
a lock device for locking an optical system or an image forming surface in a predetermined position; and
a control device disposed within the camera for controlling said shake correcting device and said lock device, wherein said lock device inputs timing data about photography from the camera and locks the optical system or the image forming surface up to an end of a mirror-up period in the camera since mirror-up was initiated.

32. A shake correcting apparatus to correct shake in a photographing apparatus, comprising:
- a shake detecting device disposed within a lens device for detecting shake in the photographing apparatus and outputting a corresponding shake detection signal;
- a shake correcting device disposed within the lens device for correcting the shake detected by said shake detecting device in response to the shake detection signal output from said shake detecting device;
- a lock device for locking an optical system or an imaging surface in a predetermined position; and
- a control device disposed within a body device for controlling said shake correcting device and said lock device, wherein said lock device inputs timing data about photography from the photographing apparatus and locks the optical system or the imaging surface with an end of exposure on the imaging surface on the basis of the timing data.

33. A shake correcting apparatus according to claim 32, wherein said photographing apparatus is a camera, and
- said lock device inputs timing data about the photography from said camera and locks the optical system or the image forming surface up to an end of a mirror-up period since mirror-up in said camera was started on the basis of the timing data.

* * * * *

UNITED STATES PATENT AND TRADEMARK OFFICE
CERTIFICATE OF CORRECTION

PATENT NO. : 5,771,405
DATED : June 23, 1998
INVENTOR(S) : Shinichi Hirano

It is certified that error appears in the above-identified patent and that said Letters Patent is hereby corrected as shown below:

Title Page, Item [30] Foreign Application Priority Data,
change "September 14, 1995 Japan 7-9236973"
to --September 14, 1995 Japan 7-236973--.

Signed and Sealed this

Twenty-ninth Day of December, 1998

Attest:

BRUCE LEHMAN

*Attesting Officer*  *Commissioner of Patents and Trademarks*